(12) United States Patent
Jones et al.

(10) Patent No.: US 11,724,346 B2
(45) Date of Patent: Aug. 15, 2023

(54) MOVING LINE ASSEMBLY OF AIRFRAMES

(71) Applicant: The Boeing Company, Chicago, IL (US)

(72) Inventors: Darrell D. Jones, Mill Creek, WA (US); Daniel R. Smith, Woodinville, WA (US); Jeremy Evan Justice, Mill Creek, WA (US); Riley HansonSmith, Bothell, WA (US); Eric M. Reid, Kenmore, WA (US); Parisa Nazaran, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,270

(22) Filed: Nov. 10, 2021

(65) Prior Publication Data

US 2022/0152757 A1    May 19, 2022

Related U.S. Application Data

(60) Provisional application No. 63/115,040, filed on Nov. 18, 2020.

(51) Int. Cl.
| | |
|---|---|
| *B23P 21/00* | (2006.01) |
| *B64F 5/10* | (2017.01) |
| *B64F 5/50* | (2017.01) |
| *B64C 1/06* | (2006.01) |

(52) U.S. Cl.
CPC .............. *B23P 21/004* (2013.01); *B64F 5/10* (2017.01); *B64F 5/50* (2017.01); *B23P 2700/01* (2013.01); *B64C 1/068* (2013.01); *B64C 1/069* (2013.01)

(58) Field of Classification Search
CPC ...... B23P 2700/01; B23P 21/004; B64F 5/10; B64F 5/50; B64C 1/068; B64C 1/069
See application file for complete search history.

(56) References Cited

U.S. PATENT DOCUMENTS

| 10,500,736 B2 | 12/2019 | Hantzschel et al. |
|---|---|---|
| 2016/0354883 A1 | 12/2016 | Vogt et al. |
| 2019/0235479 A1 | 8/2019 | Ikeda et al. |
| 2020/0094991 A1* | 3/2020 | Datas ................. B21J 15/42 |

FOREIGN PATENT DOCUMENTS

| CN | 102616095 A | 8/2012 |
|---|---|---|
| DE | 10134852 A1 | 8/2020 |
| EP | 3272454 A1 | 1/2018 |

(Continued)

OTHER PUBLICATIONS

Extended European Search Report dated Apr. 19, 2022 regarding EP Application No. 21207548.5; 9 pages.

(Continued)

*Primary Examiner* — Matthew P Travers
(74) *Attorney, Agent, or Firm* — Yee & Associates, P.C.

(57) ABSTRACT

Systems and methods are provided for aircraft assembly. The method includes receiving a half barrel section of fuselage in an assembly line having a plurality of serially arranged work stations; advancing the half barrel section in a process direction through the assembly line such that the half barrel section extends across at least a portion of the work stations; and performing work on the half barrel section with the portion of the work stations simultaneously.

24 Claims, 18 Drawing Sheets

(56) References Cited

FOREIGN PATENT DOCUMENTS

| | | |
|---|---|---|
| EP | 3378789 A1 | 9/2018 |
| EP | 3718699 A1 | 10/2020 |
| WO | 2007057411 A1 | 5/2007 |

OTHER PUBLICATIONS

Extended European Search Report dated Mar. 11, 2022 regarding EP Application No. 21197380.5; 6 pages.
International Search Report and Written Opinion dated Oct. 28, 2021 regarding NL Application No. NL2028121; 15 pages.

* cited by examiner

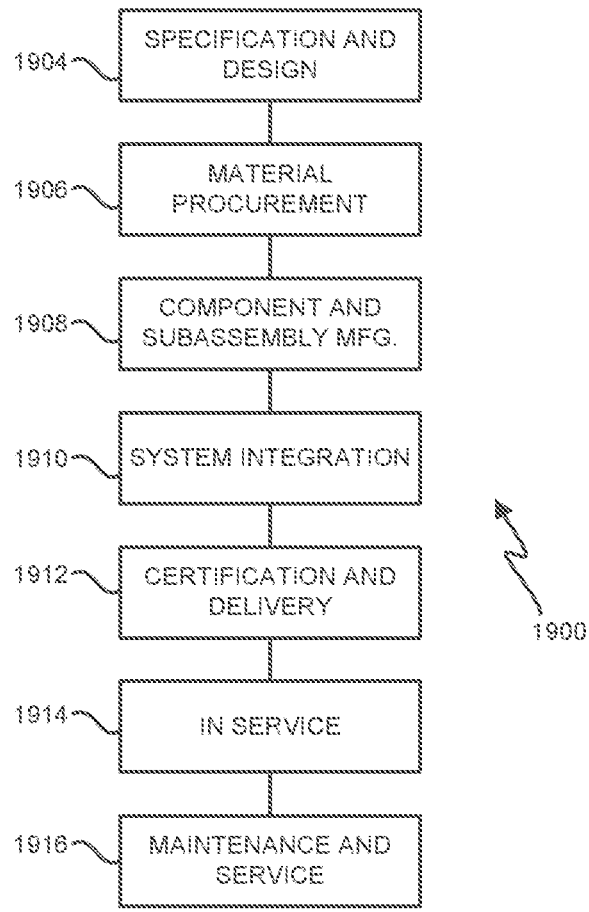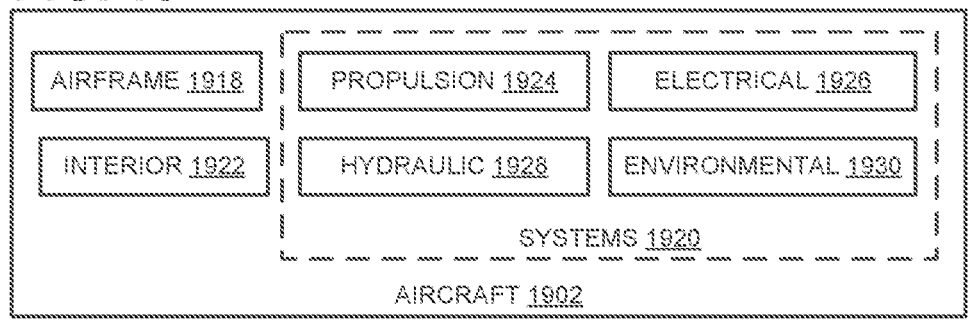

MOVING LINE ASSEMBLY OF AIRFRAMES

CROSS-REFERENCE TO RELATED APPLICATION

This application claims the benefit of U.S. Provisional Patent Application Ser. No. 63/115,040 filed Nov. 18, 2020, and entitled "Moving Line Assembly of Airframes," which is incorporated herein by reference in its entirety.

FIELD

The disclosure relates to the field of aircraft, and in particular, to fabrication of aircraft.

BACKGROUND

In the aerospace industry, operations relating to transport and assembly of airframe components are performed in fixed cells. In each cell, a structure is scanned and/or indexed to the cell, and then tools, equipment, and/or workers are brought to that portion of the structure needing to be worked upon in that cell. This process of scanning and/or indexing occurs every time a new structure is brought to the cell. Furthermore, when a structure is moved to a next cell, it is again scanned and/or indexed to the cell and the necessary tools, equipment, and/or workers are brought to that portion of the structure needing to be worked upon in that cell. Current assembly methods require tools, tooling and technicians to enter the barrel sections, which is a portion of a fuselage, through barrel ends or doorways. The tooling and tools have to be set up in place within the barrel section. When work is completed, the tooling, tools and technicians have to be transported out through barrel ends or doorways.

Therefore, it would be desirable to have a method and apparatus that take into account at least some of the issues discussed above, as well as other possible issues.

SUMMARY

Embodiments described herein provide for continuous line assembly layouts and systems that enable work to be performed on moving airframe components which are pulsed or moved continuously in a process direction to cross the paths of stations which perform work on the airframe components. The work may include laying up a preform for hardening into a composite part, hardening the composite part in an autoclave, installing frames, cutting out holes for windows or doors, etc. These arrangements provide a technical benefit over prior systems because they reduce amounts of space required for fabrication and assembly at a factory floor, increase throughput, and reduce downtime.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 18 is a flow diagram of aircraft production and service methodology in an illustrative embodiment.

FIG. 19 is a block diagram of an aircraft in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The airframe components discussed herein may be fabricated from metal or may be fabricated as composite parts. Composite parts, such as Carbon Fiber Reinforced Polymer (CFRP) parts, are initially laid-up in multiple layers that together are referred to as preforms. Individual fibers within each layer of a preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
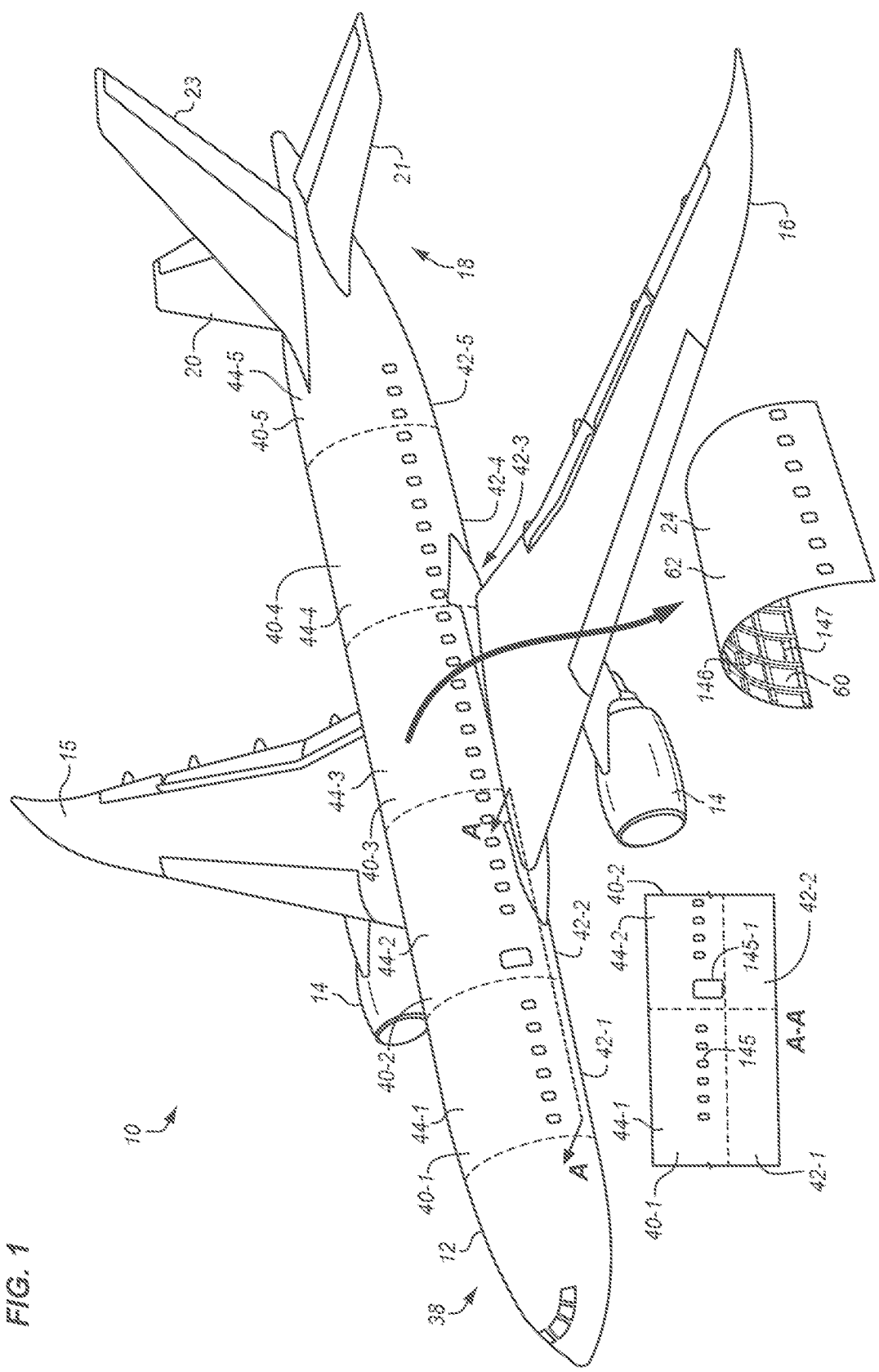
FIG. 1 illustrates an aircraft fabricated from half barrel sections.

Turning now to FIG. 1, an illustration of an aircraft 10 is depicted in which an illustrative embodiment may be implemented. In this illustrative example, aircraft 10 has a right wing 15 and left wing 16 attached to fuselage 12. One each of engines 14 are attached to right wing 15 and left wing 16. Embodiments of aircraft 10 are known with additional engines 14 and different engine placements. Fuselage 12 includes a tail section 18 and a nose section 38. Horizontal stabilizer 20, horizontal stabilizer 21, and vertical stabilizer 23 are attached to tail section 18 of fuselage 12. Aircraft 10 is an example of an aircraft where the majority of the fuselage 12 is formed from multiple half barrel sections 24, the fabrication is which is partially illustrated in FIG. 2. The multiple half barrel sections 24, when attached together, form the majority of fuselage 12.

As mentioned, fuselage 12 is fabricated from multiple half barrel sections 24. Half barrel sections 24 are configured to be either an upper half barrel section, such as upper half barrel sections 40-1, 40-2, 40-3, 40-4, or 40-5, or a lower half barrel section, such as lower half barrel sections 42-1, 42-2, 42-3, 42-4, or 42-5, which are ultimately joined together to form a full barrel section 44. The upper half barrel sections may be generally referred to as an upper half barrel section 40. The lower half barrel section may be generally referred to as a lower half barrel section 42. FIG. 1 depicts several full barrel sections 44 including: 44-1, 44-2, 44-3, 44-4, and 44-5. For completeness, full barrel section 44-1 is fabricated using upper half barrel section 40-1 and lower half barrel section 42-1, full barrel section 44-2 is fabricated using upper half barrel section 40-2 and lower half barrel section 42-2, full barrel section 44-3 is fabricated using upper half barrel section 40-3 and lower half barrel section 42-3, full barrel section 44-4 is fabricated using upper half barrel section 40-4 and lower half barrel section 42-4, and full barrel section 44-5 is fabricated using upper half barrel section 40-5 and lower half barrel section 42-5. The full barrel sections 44-1, 44-2 correspond to view A-A and illustrate that the full barrel sections 44 are serially fastened into fuselage 12. Lower half barrel section 42-3 is sometimes referred to as a wing box as the wings 15 and 16 attach to this section.

All of the above described half barrel sections (e.g., upper half barrel section 40 and lower half barrel section 42), unless specifically otherwise described, will be referred to generically as half barrel section 24. As shown in FIG. 1, each half barrel section 24 includes one or more frames 146, separated at a frame pitch 147, which helps define an inner mold line 60 and an outer mold line 62 for the half barrel section 24. In some embodiments, the half barrel section 24 comprises a hardened composite skin part or a metal skin part, such as those awaiting installation of window surrounds 145 and door surrounds 145-1 (view A-A) and frames 146 to enhance rigidity.

Figure 2:
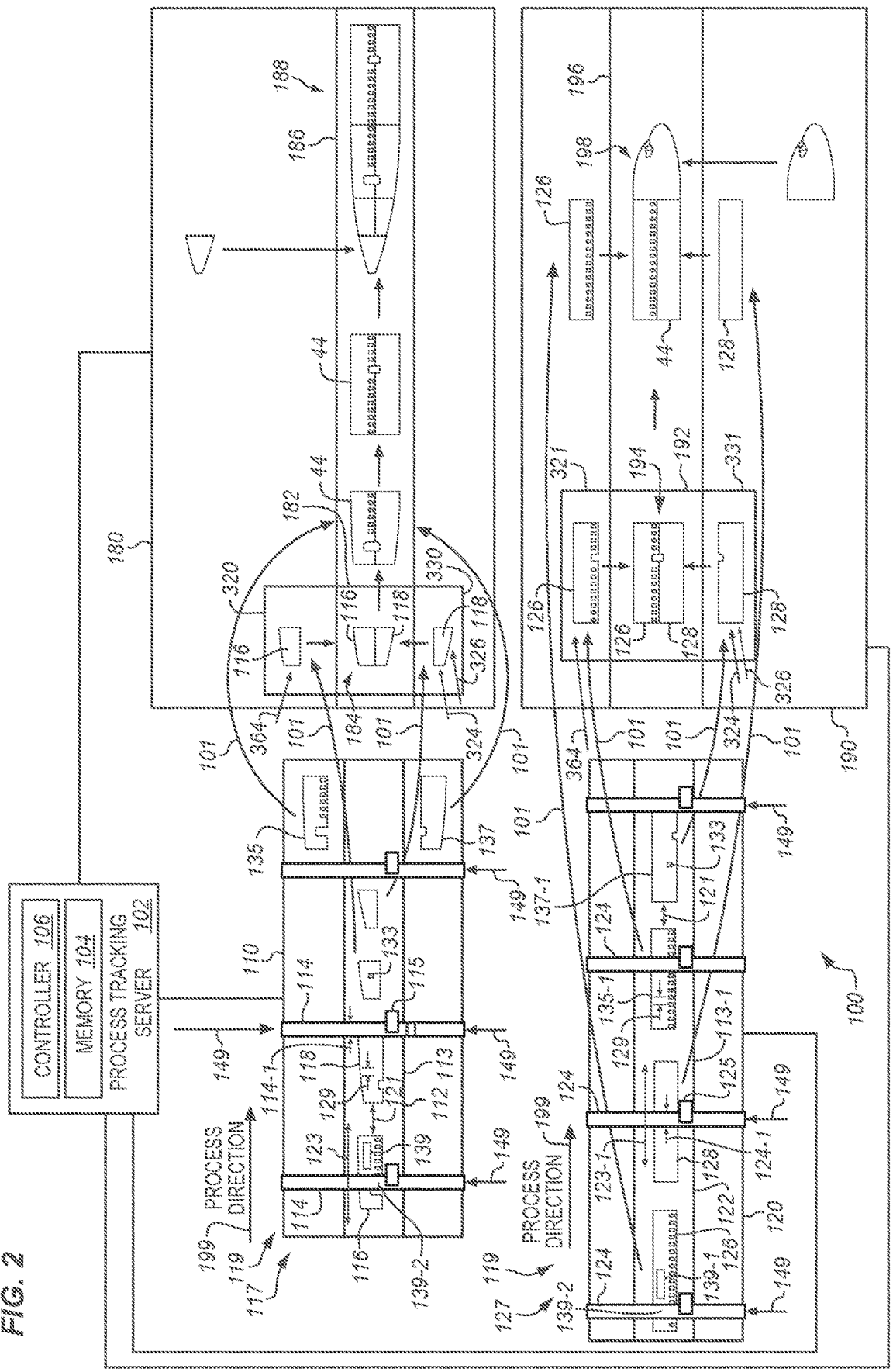
FIG. 2 depicts an assembly environment for a factory in an illustrative embodiment.

FIG. 2 depicts an assembly environment 100, or system 100, in an illustrative embodiment. Assembly environment 100 comprises an arrangement of machinery and tools that facilitates efficient and repeatable fabrication of aircraft, such as aircraft 10. Assembly environment 100 has been enhanced to enable large airframe components, such as those for wing panels or sections of fuselage, to be fabricated and assembled on continuous, micropulsed and/or pulsed assembly lines. This enables the portion of the structure needing work to be brought to workers, tools, and equipment, instead of requiring workers, tools, and equipment be brought to or into the structure. Assembly environment 100 provides a substantial benefit by reducing the amount of non-value added time expended during the assembly of an airframe, while also reducing the amount of factory space occupied by increasing work density. An embodiment has one half barrel section 24 as a composite skin part of one aircraft model and another half barrel section 24 as a metal skin part progressing serially down the assembly environment 100.

A process tracking server 102 tracks and/or manages the operations of assembly environment 100 via memory 104 and controller 106, which in the illustrated embodiment includes assembly lines 110, 120. Assembly line 110 operates to perform assembly operations on an upper half barrel section 116 and a lower half barrel section 118. Assembly line 120 operates to perform assembly operations on an upper half barrel section 126 and a lower half barrel section 128. One difference between assembly lines 110 and 120 is that assembly line 110 is configured for the assembly of non-cylindrical half barrel sections while assembly line 120 is configured for the assembly of cylindrical half barrel sections. Generally, operations of assembly lines 110 and 120 are the same, and reference numbers referring to components found in both assembly lines 110, 120 will be used, for example, work stations 114, 124 where work stations 114 are within assembly line 110 and work stations 124 are within assembly line 120. A similar methodology is used when referring to the components that are assembled in the assembly lines 110, 120. For example, upper half barrel section 116 is assembled in assembly line 110, while upper half barrel section 126 is assembled within assembly line 120. Similarly, lower half barrel section 118 is assembled in assembly line 110, while lower half barrel section 128 is assembled within assembly line 120. When a difference between the two assembly lines 110, 120 is relevant, an explanation will be provided herein.

As further discussed herein the process tracking server 102 directs the operations of one or more work stations 114, 124 in the assembly environment 100. In this embodiment, the process tracking server 102 includes a memory 104 that stores one or more Numerical Control (NC) programs for operating the assembly lines 110, 120. Controller 106 of the process tracking server 102 may further process feedback from the work stations 114, 124 and/or assembly lines 110, 120, and provide instructions to the work stations 114, 124 or reports to an operator based on such feedback.

In one embodiment, RFID readers or other indexing components 115, 125 associated with a corresponding work station 114, 124, enable the act of indexing to directly provide instructions to a work station 114, 124. The instructions are for the portion of the upper half barrel section 116, 126 and lower half barrel section 118, 128 within the purview 114-1, 124-1 of the work stations 114, 124. In such an embodiment, the instructions can be passed between controller 106 and the particular work station 114, 124. Controller 106 may be implemented, for example, as custom circuitry, as a hardware processor executing programmed instructions, or some combination thereof. Memory 104 stores instructions for operating controller 106, and stores digital data.

In this embodiment, assembly environment 100 includes an assembly line 110 for fabricating sections of fuselage 12 that exhibit non-uniform cross-sections across their length, and further includes an assembly line 120 for fabricating sections of fuselage 12 that exhibit largely uniform cross-sections across their length. The assembly line 110 processes upper half barrel section 116 and a complementary lower half barrel section 118, respectively. The assembly line 120 processes upper half barrel section 126 and a complementary lower half barrel section 128, respectively. When upper or lower is not relevant, upper half barrel section 116 and lower half barrel section 118 are sometimes referred to together herein as a half barrel section 117, while upper half barrel section 126 and lower half barrel section 128 are sometimes referred to together herein as half barrel section 127. Arcuate sections 119 refer to any type of barrel section including half barrel sections 117, 127, quarter barrel sections, and one third barrel sections, with or without a uniform cross-section.

Half barrel sections 117, 127 correspond to half barrel sections 24 after processing through assembly environment 100. The assembly lines 110, 120 discussed herein may further be operated to fabricate multiple sets of half barrel sections 117, 127 or other arcuate sections 119.

The assembly line 110 is configured with work stations 114 that are capable of accommodating upper half barrel sections 116 and lower half barrel sections 118 with more exotic shapes such as tapered, as well as other arcuate sections 119 near the nose section 38 or tail section 18. Work stations 114 associated with assembly line 110 exhibit a broader range of motion in order to accommodate the tapered nature of these half barrel sections 117 and non-uniform cross-section arcuate sections 119.

The assembly line 110 further includes a track 112, along which upper half barrel sections 116 and lower half barrel sections 118 proceed in a process direction 199. Track 112 includes a drive system 113 to advance half barrel sections 117 along the track 112. The track 112 brings the half barrel sections 117 in a process direction 199 to tools and equipment (not shown) disposed at work stations 114, 124 which are serially arranged in a process direction 199.

The track 112 may comprise a series of discrete stanchions having rollers, a rail or set of rails (not shown), etc., and airframe components at the track 112 may be pulsed incrementally in the process direction 199 across the work stations 114, 124. Work stations 114, 124 are serially aligned, and the sections half barrel sections 117 or arcuate sections 119 proceed through the work stations 114, 124 serially. While only a few work stations 114, 124 are shown, many are contemplated, since work stations 114, 124 can be configured to perform operations such as, but not limited to, demolding, installing window surrounds, installing door surrounds, trimming manufacturing excess, installing frames, cutting out window manufacturing excess or otherwise removing material, NDI inspection, edge sealing, cutting out door manufacturing excess, installing windows and installing doors. Some work stations 114, 124 may perform multiple of the above listed tasks, while other work stations 114, 124 are dedicated to a single task. In some illustrative examples, the tasks may be referred to as assembly tasks.

In one embodiment, the work stations 114, 124 are spaced and operated such that work is performed by multiple work stations on an upper half barrel section 116 of fuselage 12 simultaneously. The same is true for lower half barrel sections 118. In a further embodiment, the work stations 114 are arranged at a work density, at least in part, based on a takt time for the half barrel section 117 or the arcuate section 119 being fabricated. The same is true for work stations 124 with respect to upper half barrel sections 126 and lower half barrel sections 128. That is, the work stations 124 are arranged at a work density, at least in part, based on a takt time for the half barrel section 127 or the arcuate section 119 being fabricated.

The assembly line 110 processes the upper half barrel section 116 and delivers it to assembly stage 320, for example, configured as a crown module attach station, for attachment of a crown module 364. The assembly line 110 processes the lower half barrel section 118 for delivery to assembly stage 330, for example, configured as a floor grid attach station, for joining to a passenger floor grid 326 and/or a cargo floor grid 324.

Figure 5:
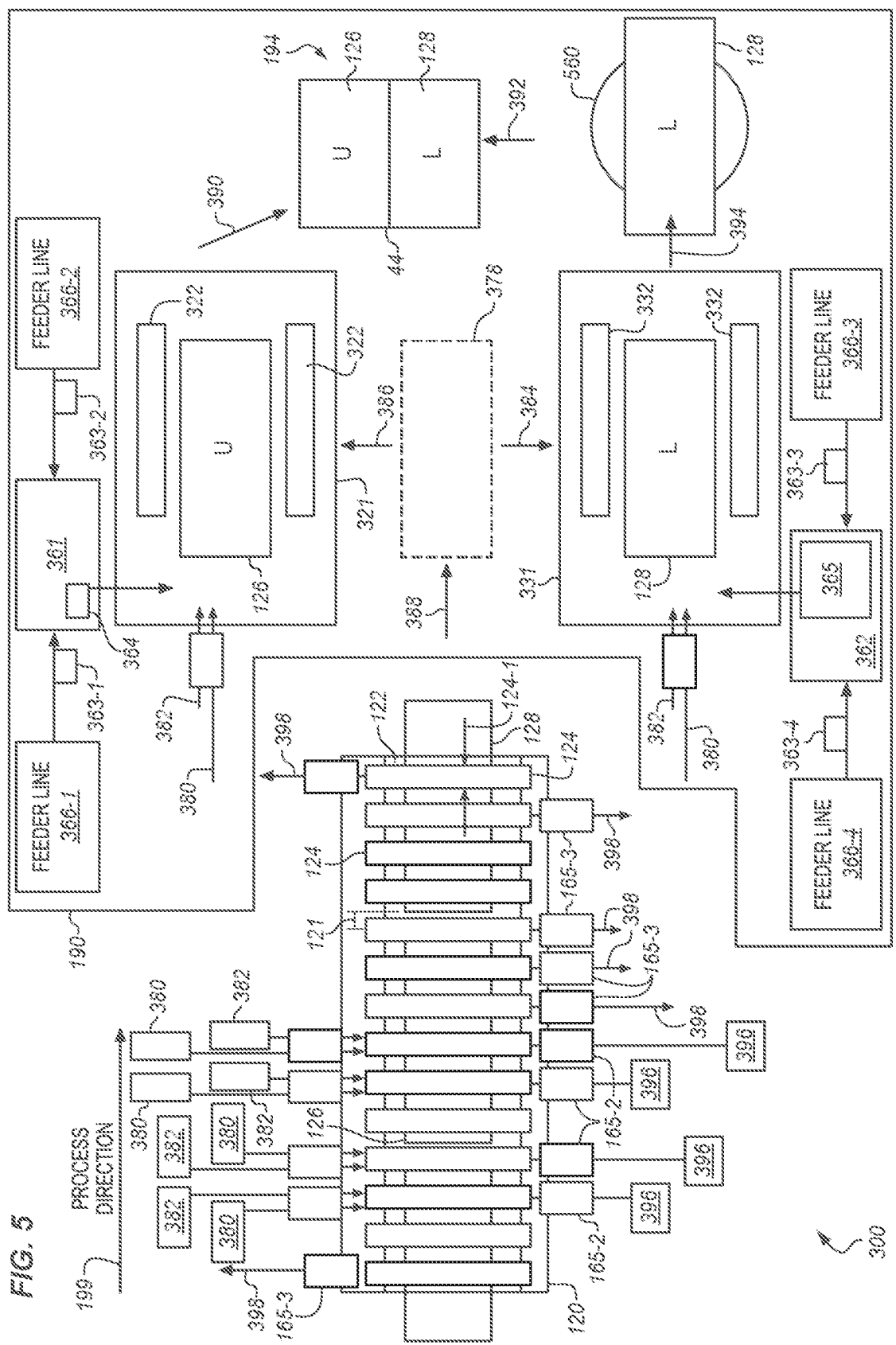
FIG. 5 illustrates in detail a portion of the assembly environment of FIG. 2 including parallel and serial assembly lines for processing upper sections and lower sections of a fuselage.

In much the same way, work stations 124 are spaced and operated in the assembly line 120 to process the upper half barrel sections 126 and the lower half barrel sections 128, that is, half barrel sections 127 along a track 122 having a drive system 113-1. The assembly line 120 processes the upper half barrel section 126 and delivers it to assembly stage 321 for joining to a crown module 364 as well as the lower half barrel section 128 which is delivered to an assembly stage 331 for joining to a passenger floor grid 326 and/or a cargo floor grid 324. It is understood that a crown module for upper half barrel section 116 is different than a crown module for upper half barrel section 126, since upper half barrel section 126 is represented as being cylindrical and longer than upper half barrel section 116, but for ease of understanding, both crown modules will be referred to herein as crown module 364. Similarly, no matter which lower half barrel section is being referred to, the passenger floor grid is referred to as passenger floor grid 326 and the cargo floor grid is referred to as cargo floor grid 324, the floor grids in combination being referred to herein in subsequent figures as floor grid 365 (FIG. 5).

The assembly line 120 includes track 122, along which upper half barrel section 126 and lower half barrel section 128 proceed in the process direction 199 in a similar fashion to that described above for the assembly line 110. The assembly line 120 further includes work stations 124 having indexing components 125. The work stations 124, indexing components 125, and track 122 may be implemented in a similar fashion to similarly recited components of the assembly line 110. However, the work stations 124 may differ in that they may be more tightly conformed to each of the upper half barrel section 126 and lower half barrel section 128 being worked upon. There is less cross-sectional variation between the upper half barrel section 126 and the lower half barrel section 128 than upper half barrel section 116 and the lower half barrel section 118. As mentioned above, upper half barrel section 126 and the lower half barrel section 128 of assembly line 120 are more uniform in shape and size than of the upper half barrel section 116 and the lower half barrel section 118 of the assembly line 110.

In further embodiments, additional assembly lines fabricate wings 15, 16 for assembly together with the fuselage 12 to form a complete airframe. The assembly lines 110, 120 are either operated in a pulsed fashion where the upper half barrel sections 116, 126 and lower half barrel sections 118, 128 advance in a process direction 199 a distance equal to a length of a pulse 123, 123-1 or a length of a micropulse 129. Both pulse 123 and pulse 123-1 are used to illustrate that a pulse length could be different for assembly lines 110 and 120. A micropulse 129 is less than pulse 123, 123-1, and in an embodiment, is equal to a frame pitch 147 between frames 146 of the upper half barrel sections 116, 126 and lower half barrel sections 118, 128 or a fraction or multiple thereof. A length of a pulse 123, or a length of a micropulse 129 can be the same for assembly lines 110 and 120, or they can be different. Frame pitch 147 in an embodiment is about 18 to about 36 inches. After the micropulse 129, the upper half barrel sections 116, 126 and lower half barrel sections 118, 128 pause, then micropulse again 129 in a process direction 199.

Another embodiment has the upper half barrel sections 116, 126 and lower half barrel sections 118, 128 continuously advancing in the process direction 199 without pause. Thus, the assembly lines 110, 120 discussed herein enable half barrel sections 117, 127 to proceed with a desired takt across multiple different work stations 114, 124 in a pulsed 123, 123-1, micropulsed 129 or continuous fashion.

During these processes, tooling such as layup mandrels may be placed onto or removed from the tracks 112, 122 as needed. In one embodiment, the track 112, 122 include a drive system 113, 113-1, such as a chain drive, that moves the half barrel sections 117, 127, although in further embodiments the sections are independently driven along the tracks 112, 122.

In one embodiment, and referring to assembly line 110, the upper sections 116 and the lower half barrel sections 118 are pulsed synchronously at the same time by the same amount of distance in the process direction 199. The work stations 114 then perform work upon the upper half barrel section 116 or the lower half barrel section 118 in pauses between the pulses and/or during pauses at a common takt time. Thus, during the fabrication process, multiple work stations 114 work upon the upper half barrel sections 116 and/or the lower half barrel sections 118 during the same pause between micropulses 129 and/or during micropulse 129.

Similarly, and referring to assembly line 120, the upper half barrel sections 126 and the lower half barrel sections 128 are pulsed synchronously at the same time by the same amount of distance in the process direction 199. The work stations 124 then perform work upon the half barrel section 126 or the lower half barrel section 128 in pauses between the pulses and/or during pauses at a common takt time. Thus, during the fabrication process, multiple work stations 124 work upon the upper half barrel sections 126 and/or lower half barrel sections 128 during the same pause between micropulses 129 and/or during micropulse 129.

In one embodiment of assembly line 110, one or more work stations 114 also perform their work independently or synchronously upon the same half barrel section 117 or the arcuate section 119 during a pulse. Similarly, and in regard to assembly line 120, one or more work stations 124 also perform their work independently or synchronously upon the same half barrel section 127 or the arcuate section 119 during a pulse. Such work stations might be referred to as traveling work stations 139, 139-1 as they are attached to the half barrel section and move with the half barrel section. This work may include Non-Destructive Inspection (NDI), trimming of a manufacturing excess, or application of a sealant or other processes. In further embodiments, the half barrel sections 117, 127 proceed continuously along the track 112, 122, and the work stations 114, 124 perform work on the half barrel sections 117, 127 as the half barrel sections 117, 127 and the traveling work stations 139, 139-1 attached thereto continue to move.

In some embodiments of assembly line 110 or 120, the half barrel sections 117, 127 are spaced with predetermined gaps 131 such as equal to a micropulse 129 distance such as a fraction or multiple of frame pitch 147 or any distance less than or equal to a length of the half barrel section 117, 127 or the arcuate section 119. Such gaps 131 help to account for production delays, such as re-work or out of position work of the half barrel section 117, 127 or the arcuate section 119 or work station 114, 124 maintenance and/or technician break time.

Re-work or out of position work is rarely required, but can be performed in certain circumstances when a portion of the half barrel section 117, 127 or the arcuate section 119 needing re-work or out of position work is between work stations 114, 124 or within work stations that do not need to perform work such as a window surround installation station opposite a lower half barrel section 118. This enables unaccounted-for delays to be absorbed into the production process. The rework or out of position work discussed above can be performed within gaps 131 between the work stations 114, 124. Furthermore, in one embodiment, the half barrel section 117, 127 or the arcuate section 119 continues to progress through the work stations 114, 124 while the rework or out-of-position work is being performed. Thus, the assembly environment 100 does not stop advancing in process direction 199 to work upon half barrel section 117, 127 or the arcuate section 119 to accommodate rework or out-of-position work. Such out of position work can include scheduled and unscheduled maintenance.

During the movement or in between micropulses 129 or pulses 123, 123-1, the half barrel sections 117, 127 or the arcuate sections 119 encounter the indexing components 115, 125 at the work stations 114, 124. The indexing components 115, 125 physically interact with or nondestructively inspect indexing features 133 on or in the upper half barrel sections 116, 126 and lower half barrel sections 118, 128 and enable alignment to the work stations 114, 124 before work is performed.

The indexing features 133, such as physical features or Radio Frequency Identifier (RFID) chips, are engaged by an indexing components 115, 125 associated with the work station 114, 124. Each indexing component 115, 125 conveys to the work station 114, 124 a 3D characterization of the upper half barrel sections 116, 126 and lower half barrel sections 118, 128 within a purview 114-1, 124-1 of the work station 114, 124. The indexing also enables the determination of which tasks that a work station 114, 124 is to accomplish on the particular half barrel section 117. The work/task are based on the information that the indexing features 133 convey to the indexing components 115, 125.

Referring back to FIG. 1, an example of 3D characterization is of the Inner Mold Line (IML) 60 and/or Outer Mold Line (OML) 62. The indexing described above results in instructions to the work station 114, 124 about the work to be performed by the work station 114, 124 upon the upper half barrel sections 116, 126 and lower half barrel sections 118, 128. This indexing process can be performed multiple times, and at the same time, per pulse, or micropulse 129, for respective multiple work stations 114, 124. The work stations 114, 124 may then perform the work during the pause between micropulses 129 or during the micropulses 129 themselves.

The indexing components 115, 125 can comprise hard stops, pins, holes, or grooves that are complementary to the indexing features 133 for physical securement thereto. An embodiment has many indexing features arrayed upon the upper half barrel sections 116, 126 and lower half barrel sections 118, 128, for example, in a manufacturing excess. In further embodiments, the indexing components 115, 125 can comprise sensors, such as laser, ultrasonic, or visual inspection systems that track and then align with indexing features 133.

Additional indexing features 133 also include RFID chips. RFID readers are another embodiment of indexing component 115, 125, that read the RFID chips. These non-contact techniques may be utilized, for example, within assembly lines 110, 120 that continuously move upper half barrel sections 116, 126 and lower half barrel sections 118, 128 and may further be used to control movement of the half barrel sections 117 and/or arcuate sections 119.

In further embodiments, indexing components 115, 125 of hard stops, pins, holes, or grooves that are complementary to the indexing features 133 are utilized for continuous movement systems where traveling work stations 139, 139-1 are utilized. In such embodiments, engagement of indexing features 133 to indexing components 115, 125 occur during the advancement of the upper half barrel sections 116, 126 and lower half barrel sections 118, 128 within purview 114-1, 124-1 of the next work station 114, 124. The work station 114, 124 can track the half upper half barrel sections 116, 126 and lower half barrel sections 118, 128 as they advance in the process direction 199. Continuing, traveling work stations 139, 139-1 are attached in a work station 114, 124 to the upper half barrel sections 116, 126 or lower half barrel sections 118, 128 and ride along with the half barrel sections 117, 127 as it progresses in micropulse 129, pulse 123 or continuously.

The traveling work station 139, 139-1 performs its work upon the half barrel sections 117, 127 and then separates and returns to the attachment point 139-2 for future use. An example of the traveling work station 139, 139-1 is a flex track device or some similar device that follows a track removably installed onto the upper half barrel section 116, 126 and/or lower half barrel section 118, 128.

Prior to entry into the assembly environment 100, the upper half barrel sections 116, 126 and lower half barrel sections 118, 128 are laid up upon a layup mandrel (not shown) orientated with the crown 135, 135-1 up and the keel 137, 137-1 up, respectively. The orientation of the lower half barrel sections 118, 128 is maintained from demold from the layup mandrel, through floor grid 365 installation, and up to where the lower half barrel sections 118, 128 are inverted into a keel 137, 137-1 down orientation. This inversion occurs in an inversion station 560 (FIG. 7) just prior to pulsing to join station 194. This configuration enables different work stations 114, 124 to serially process the upper half barrel sections 116, 126 and lower half barrel sections 118, 128 in a pulsed manner through the same work stations 114, 124 during fabrication.

In one embodiment, the orientation of upper half barrel sections 116, 126 and lower half barrel sections 118, 128 on assembly line 110, 120, respectively, is set by a layup mandrel upon which the sections were laid up. The layup mandrel progresses from layup through cure with a preform laid-up onto it. After hardening, the upper half barrel sections 116, 126 and lower half barrel sections 118, 128 are then removed from the respective layup mandrels without changing the upper half barrel sections 116, 126 and lower half barrel sections 118, 128 orientation.

In an embodiment, multiple aircraft models are processed in serial on assembly lines 110, 120. Upper half barrel sections 116, 126 and lower half barrel sections 118, 128 for one model serially proceed down the assembly line 110, 120 followed by the upper half barrel sections 116, 126 and lower half barrel sections 118, 128 of a different model. For example, a lower half barrel section 118, 128 progresses down an assembly line 110, 120 followed by a complementary upper half barrel sections 116, 126. Likewise, these lower half barrel sections 118, 128 and upper half barrel sections 116, 126 might be followed by another aircraft model's lower half barrel sections 118, 128 and upper half barrel sections 116, 126, followed by the lower half barrel sections 118, 128 and upper half barrel sections 116, 126 of yet another model and so forth between aircraft models, if such a production methodology meets a need. Additionally, more than one assembly line 110, 120 each are also envisioned in some embodiments to make sure that upper half barrel sections 116, 126 and lower half barrel sections 118, 128 are produced at a desired rate.

In some embodiments, work stations 114, 124 discussed herein have the capability of performing work on different portions of upper half barrel sections 116, 126 and lower half barrel sections 118, 128 and are able to accommodate different diameters from model to model. Each indexing operation between indexing components 115, 125 and indexing features 133 tells the work station 114, 124 what lower half barrel sections 118, 128 and upper half barrel sections 116, 126 and which airplane model is within its purview 114-1, 124-1 and what work needs to be performed, or if no work needs to be performed. For example, window manufacturing excess cut out stations may refrain from creating window cut outs when a lower half barrel section 118, 128 is within their purview 114-1, 124-1 since a window cut out is not needed.

A process tracking server 102 tracks and/or manages the operations of assembly lines 110, 120 discussed herein, for example, by directing the operations of one or more work stations 114, 124 in the assembly environment 100. In this embodiment, the process tracking server 102 includes a memory 104 that stores one or more Numerical Control (NC) programs for operating the assembly lines 110, 120. A controller 106 of the process tracking server 102 may further process feedback from the work stations 114, 124 and/or assembly lines 110, 120, and provide instructions to the work stations 114, 124 or reports to an operator based on such feedback. In one embodiment, RFID readers or other indexing components 125 enable the act of indexing to directly provide instructions to a work station 114, 124 for the portion of the upper half barrel section 116, 126 and lower half barrel section 118, 128 within the purview 114-1, 124-1 of the work station 114, 124. In such an embodiment, the instructions can be passed between controller 106 and the particular work station 114, 124. Controller 106 may be implemented, for example, as custom circuitry, as a hardware processor executing programmed instructions, or some combination thereof. Memory 104 stores instructions for operating controller 106, and may comprise a suitable receptacle for storing digital data.

Figure 3:
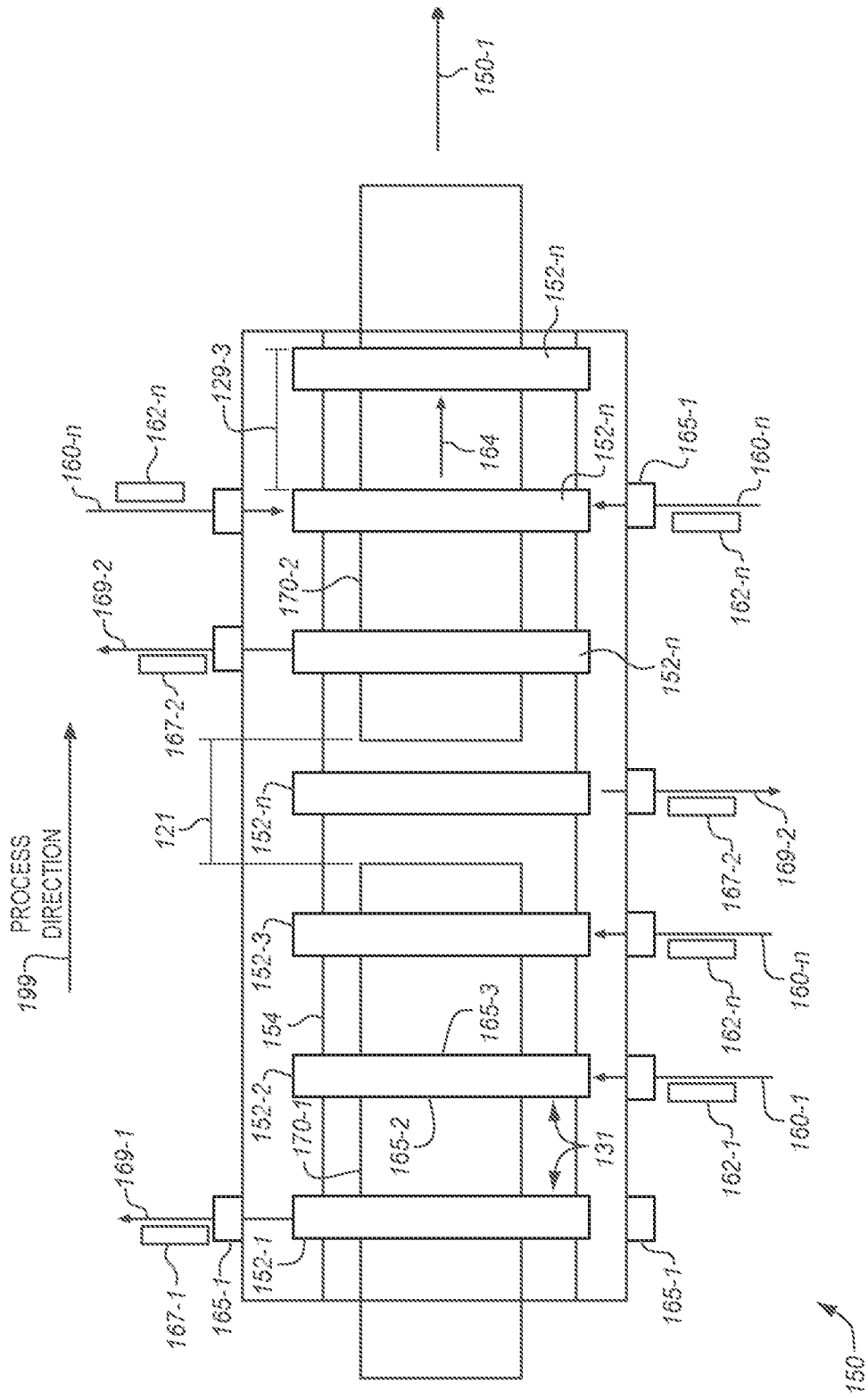
FIG. 3 depicts an assembly line for a factory in an illustrative embodiment.

According to FIG. 2, each work station 114 at an assembly line 110 may be fed/supplied materials and/or components by a corresponding feeder line 149 (e.g., based on a takt time for a section of fuselage, and as illustrated in FIG. 3), and these materials and/or components are affixed to the upper half barrel section 116, 126 and lower half barrel section 118, 128 being worked upon by the work stations 114, 124. Feeder lines 149 provide additive materials/components to the work stations 114, 124. Each feeder line 149 is designed to generate materials at a takt time in order to provide the additive material/component to a work station 114, 124 just in time (JIT) for assembly onto a larger structure (e.g., a section of fuselage), which is also pulsed at a takt time. That is, the feeder lines 149 deliver the components JIT to the work stations 114, 124 in an order of usage by the work stations 114, 124. In some illustrative examples, the feeder lines 149 perform delivering components to one of the work stations 114, 124 as the half barrel section pulses to or micropulses through the work station. In some illustrative examples, delivering components is performed in an order of usage by the work station.

In one embodiment, the feeder lines 149 that have a takt time equal to a fraction of a fuselage takt time.

The takt times of the feeder lines 149, and/or the assembly lines 110, 120 need not be the same. For instance, an upper half barrel section 116 and a lower half barrel section 118 may be micropulsed through several work stations 114 at the same time. The upper half barrel section 116 and lower half barrel section 118 are indexed to the work stations 114 and each dedicated feeder line 149 performs, for example, NDI, window surround installation, door surround installation, window manufacturing excess trim/removal, door manufacturing excess trim/removal, installing windows and installing doors etc. Feeder lines 149 also include output from the work stations 114, including NDI inspection data and any excess trimmed off of upper half barrel section 116 and lower half barrel section 118. A similar scenario can occur for assembly line 120 and the various components therein and assembled therein.

In a further example, the feeder line 149 provide frames 146 JIT to a work station 114 that installs frames 146 onto upper half barrel section 116 and lower half barrel section 118. Likewise, feeder lines 149 provide window surrounds JIT to a work station 114 where window surrounds are installed and door surrounds JIT to a work station 114 where door surrounds are installed. For each feeder line 149, production times are designed based on the takt of an associated work station 114. The feeder lines 149 each serially pulse components during fabrication, and completed components arrive at each work station 114 at a common takt time. This takt time design proceeds through each of the feeder lines 149 from the smallest part to the largest final assembly.

If a takt time cannot be achieved, it is possible to adjust the work statement of particular work station 114 to reduce or increase the amount of work occurring at the particular work station 114. In a further embodiment, it is possible to add or remove a work station 114 from the process based upon a work statement and a desired takt time for the entirety of assembly line 110. Takt time is considered to be a number of minutes per month, divided by a number of desired units (e.g., of aircraft, stringers, frames, etc.) per month. The sum of micropulse takt times equals a pulse of takt time. That is, after a number of micropulses equal to a full pulse, an entire unit has advanced by its length through an assembly line 110. For examples, the assembly line 110 is comprised of an integer multiple of standard module work stations 114 which enable it to be designed upfront to have blank, or unused, work stations 114 at low rates and add functional work stations 114, if required for certain processes into those unused work stations 114, to accommodate higher product output in areas that are sensitive to product output.

According to FIG. 2, and referring specifically to assembly line 120, and similar to assembly line 110, each work station 124 at an assembly line 120 may be fed/supplied materials and/or components by a corresponding feeder line 149 (e.g., based on a takt time for half barrel section 127, and as illustrated in following FIG. 3), and these materials and/or components are affixed to the upper half barrel section 126 and lower half barrel section 128 being worked upon by the work stations 124. Feeder lines 149 provide additive materials/components to the work stations 124. Each feeder line 149 is designed to generate materials at a takt time in order to provide the additive material/component to a work station just in time (JIT) for assembly onto a larger structure (e.g., a section of fuselage), which is also pulsed at a takt time. The feeder line 149 takt time may be the same or different from the takt time of assembly line 120. That is, the feeder lines 149 deliver the components JIT to the work stations 124 in an order of usage by the work stations 124. In one embodiment, the feeder lines 149 that have a takt time equal to or at a fraction of a fuselage takt time.

The takt times of the feeder lines 149, and/or the assembly lines 120 need not be the same. For instance, an upper half barrel section 126 and lower half barrel section 128 may be micropulsed through several work stations 124 at the same time. The upper half barrel section 126 and lower half barrel section 128 is indexed to the work stations 124 and each dedicated feeder line 149 performs NDI, window surround installation, door surround installation, window manufacturing excess trim/removal, door manufacturing excess trim/removal, installing windows and installing doors etc. Feeder lines 149 also include output from the work stations 124, including NDI inspection data and any excess trimmed off of upper half barrel section 126 and lower half barrel section 128. The feeder lines 149 synchronize to a pulse time or velocity of a main assembly line, to supply what is needed, when it is needed.

In a further example, the feeder line 149 provide frames 146 JIT to a work station 124 that installs frames 146 onto upper half barrel section 126 and lower half barrel section 128. Likewise, feeder lines 149 provide window surrounds JIT to work stations 124 where window surrounds are installed and door surrounds JIT to work stations 124 where door surrounds are installed. For each feeder line 149, production times are designed based on the takt of an associated work station 124. The feeder lines 149 each serially pulse components during fabrication, and completed components arrive at each work station 124 at a common takt time. This takt time design proceeds through each of the feeder lines 149 from the smallest part to the largest final assembly.

If a takt time cannot be achieved by the assembly line 120 or feeder line 149, it is possible to adjust the work statement of particular work station 124 to reduce or increase the amount of work occurring at the particular work station 124. In a further embodiment, it is possible to add or remove a work station 124 from the assembly line 120 based upon a work statement and a desired takt time for the entirety of assembly line 120. Takt time is considered to be a number of minutes per month, divided by a number of desired units (e.g., of aircraft, stringers, frames 146, etc.) per month. The sum of micropulse takt times equals a full pulse of takt time. That is, after a number of micropulses 129 equal to advancing by its length through an assembly line 120.

FIG. 2 further depicts airframe assembly regions 180 and 190, which receive the outputs of assembly lines 110 and 120 respectively. Upper half barrel sections 116, 126 and lower half barrel sections 118, 128 are joined into the various full barrel sections 44 described with respect to FIG. 1. It is important to note that upper half barrel sections 116 and lower half barrel sections 118 come in various shapes and lengths as is depicted in FIG. 2.

Joining of upper half barrel section 116 and lower half barrel section 118 occurs within joining work station 182 and joining of upper half barrel section 126 and lower half barrel section 128 occurs within joining work station 192. Join station 184 is part of work station 182, and join station 194 is part of work station 192. The full barrel sections 44 that result proceed along tracks 186 and 196, to respective work cells 188 and 198 where full barrel sections are joined together. As illustrated by FIG. 2 the full barrel sections include those with uniform and non-uniform cross-sections. In further embodiments, the operations of the assembly lines 110, 120 discussed herein are merged into a single assembly line.

Arrows 101 indicate where differently shaped upper half barrel sections 116 and lower half barrel section 118 are moved as they exit assembly line 110 and enter airframe assembly region 180. For example, arrows 101 depict lower half barrel section 118 and upper half barrel section 116 being moved to an assembly stage 320 and assembly stage 330, respectively, and then to join station 184 for joining, and movement to different assembly lines, etc. Arrows 101 indicate where similarly shaped upper half barrel sections 126 and lower half barrel sections 128 are moved as they exit assembly line 120 and enter airframe assembly region 190. For example, arrows 101 depict lower half barrel section 128 and upper half barrel section 126 being moved to an assembly stage 321 and assembly stage 331, respectively, and then to join station 194 for joining, and movement to different assembly lines, etc.

In an embodiment, upper half barrel section 116 is joined with crown module 364 and lower half barrel section 118 is joined with cargo floor grid 324 and/or passenger floor grid 326 in assembly stages 320 and 330, respectively. Assembly stages 320 and 330 are part of the upper half barrel section 116 and lower half barrel section 118 assembly process much like assembly stages 321 and 331 are part of the upper half barrel section 126 and lower half barrel section 128 assembly process where crown modules 364, cargo floor grids 324, and passenger floor grids 326 are similarly installed. Likewise join station 184 is part of the assembly process for the upper half barrel section 116 and lower half barrel section 118 and similarly corresponds to join station 194 which is part of the assembly process for the upper half barrel section 126 and lower half barrel section 128.

FIG. 3 depicts an assembly line 150, or system, for a component 170-1, 170-2 in a factory in an illustrative embodiment. The assembly line 150 may be utilized for any component 170-1, 170-2, such as for post-hardening or pre-hardening fabrication and/or assembly processes, and may be utilized as a feeder line 149 (FIG. 2) to provide components 170-1, 170-2 that are used by downstream assembly lines 150. The component 170-1 may be different and distinct from component 170-2 or components 170-1 and 170-2 may be exactly the same. For instance, and relevant to subsequent figures, components 170-1, 170-2 are intercostals 513, floor beams 511, or might be crown modules 364 or floor grids 365 in various stages of completion.

Component 170-1 and component 170-2 progress through serially arranged work stations 152-1 through 152-n, wherein these multiple work stations perform work on component 170-1 while additional work stations perform work on component 170-2 during a micropulse 129-3 or pause between micropulses 129-3. The work stations 152-1 through 152-n or subgroupings thereof may sometimes be referred to as work stations 152. It is understood that as components move down assembly line 150 that only a single work station might be performing work on a single component, depending on the progress of the components through the assembly line 150.

In this embodiment, the assembly line 150 includes work stations 152-1 through 152-n that perform work such as layup, inspection, hardening, trimming, pick and placement, joining, fastening, etc., as the components 170-1, 170-2 proceed along track 154. The work stations 152-1 through 152-n perform work on the components 170-1, 170-2 such as those mentioned in the preceding paragraph during a same pause between pulses 123, 123-1 (FIG. 2) or micropulses 129-3 (FIG. 2) of the components 170-1, 170-2 in the process direction 199.

In the illustrated embodiment, one of work stations 152-n is disposed at a gap 121 between components 170-1, 170-2 which move or pulse 123 in the process direction 199. While disposed at the gap 121, work station 152-n receives maintenance and/or inspection, and/or technicians operating the work station 152-n may engage in a break while the work station 152-n is not performing work on one of the components 170.

In one example of the illustrated embodiment, exit line 169-1 carries inspection data 167-1 from work station 152-1 while exit line 169-2 carries removed material 167-2 from one of work stations 152-n. An example of inspection data 167-1 is the inspection data for a component 170 from a work station 152-1 configured as an NDI station. Similarly, when component 170 is mechanically trimmed, the removed material 167-2 is taken away from two work stations 152-n on exit lines 169-2, the particular work stations 152-n being configured as trimming stations.

Feeder lines 160-1 through 160-n provide subcomponents 162-1 through 162-n to work stations 152-2, 152-3 and one of work station 152-n. In some illustrative examples, feeder lines 160-1 through 160-n or subgroupings thereof may sometimes be referred to as feeder lines 160. In some illustrative examples, subcomponents 162-1 through 162-n or subgroupings thereof may sometimes be referred to as subcomponents 162. In one example, the subcomponent 162-1 is coupled to the component 170 present in work station 152-2. The subcomponents 162-1, 162-n arrive at various work stations 152-2, 152-n, and these work stations 152-2, 152-n utilize the subcomponents 162-1, 162-n by consuming, placing, or otherwise utilizing the subcomponents 162-1, 162-n to facilitate fabrication of components 170-1, 170-2.

A path 164 is through an ingress 165-2 and egress 165-3 for each of the work stations 152, an example of which is illustrated at work station 152-2, for the components 170. In this embodiment, each feeder line 160-1, 160-n provides subcomponents 162-1, 162-n to a work station 152-1, 152-2, 152-3, 152-n, and may provide the subcomponents 162-1, 162-n via an ingress/egress port 165-1 that is independent of the path 164.

Removed material 167-2 may also be removed via independent ingress/egress ports 165-1. In one embodiment, the actions of the feeder lines 160-1, 160-n and assembly line 150 are coordinated to facilitate just-in-time (JIT) delivery of components to subsequent assembly line 150-1 to which it feeds according to a takt-time for the component 170-1, 170-2, which the work stations 152-1 through 152-n work to. In one embodiment, the assembly line 150 is utilized for fabricating floor grids 324, 326 and feeder lines 160-1, 160-n provide floor grid components such as intercostals, floor beams, tracks, electrical equipment, plumbing, and floor panels. Panels are provided just in time (JIT) for joining into a floor grid 365.

In one embodiment, one or more of work stations 152-1, 152-2, 152-3, and 152-n comprise NDI stations, rework stations downstream of the NDI stations that address any out of tolerance conditions identified by NDI inspection. Many of these work stations 152-1, 152-2, 152-3, 152-n include a feeder line 160-1, 160-n devoted to the inputting of material intended for addition at that work station 152-1, 152-n. The assembly line 150 is representative of one or all of assembly line 110, assembly line 120, assembly region 180, and assembly region 190. As further described herein, the assembly line 150 can also be representative of assembly stages 320, 321, 330, and 331.

Figure 4:
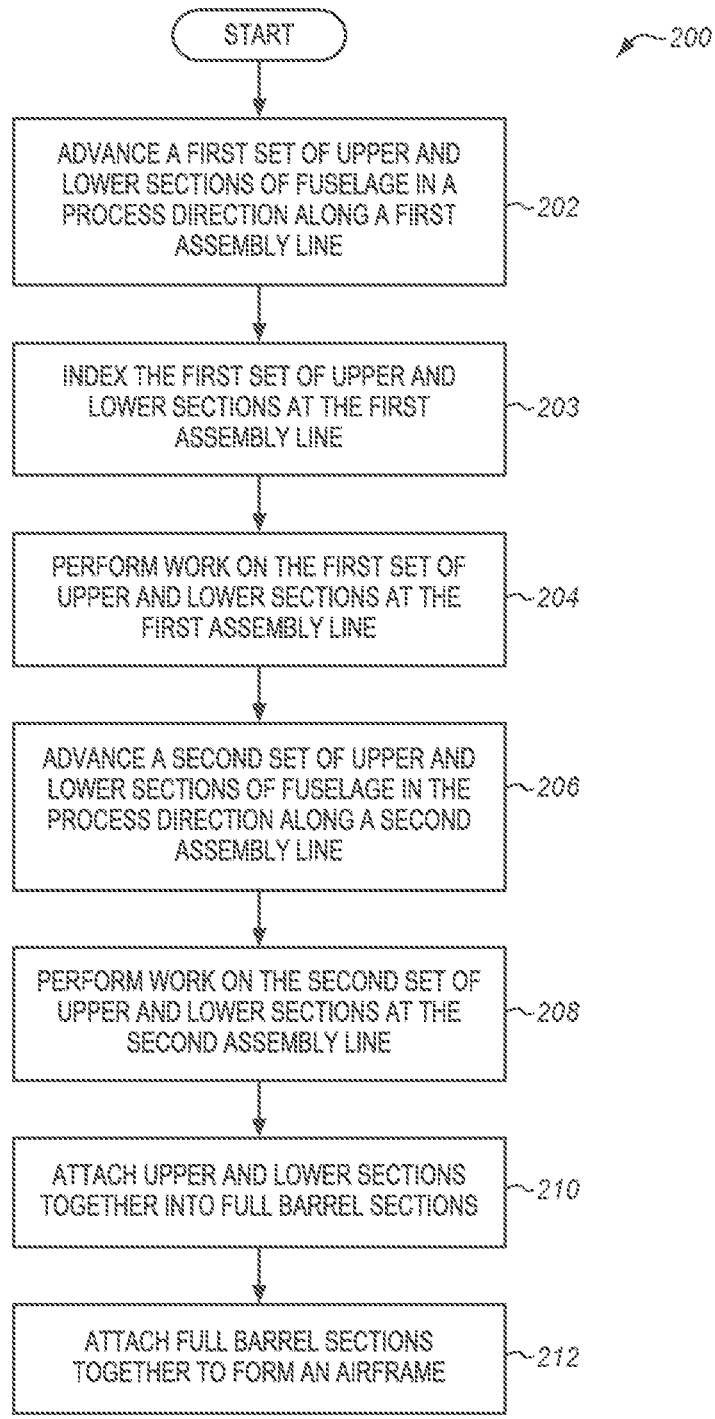
FIG. 4 is a flowchart depicting a method for assembling an airframe for an aircraft using the assembly environment of FIG. 2 in an illustrative embodiment.

FIG. 4 is a flowchart depicting a method 200 for assembling an airframe for an aircraft using the assembly environment of FIG. 2 in an illustrative embodiment. The steps of method 200 are described with reference to assembly environment 100 of FIG. 2, but those skilled in the art will appreciate that method 200 may be performed in other systems. The steps of the flowcharts described herein are not all inclusive and may include other steps not shown. The steps described herein may also be performed in an alternative order.

Referring to the flowchart, a first set of lower half barrel sections 118 and upper half barrel sections 116 of fuselage 12 are advanced 202 in the process direction 199 along the first assembly line 110. This may be performed in a synchronous micropulsed fashion, where the lower half barrel section 118 and upper half barrel section 116 are serially advanced by micropulse 129 and then paused or as part of a continuously moving process. The lower half barrel section 118 and upper half barrel section 116 are fabricated in alternating fashion, so that lower half barrel section 118 and upper half barrel section 116 can be paired for joining into the same full barrel section 44 necessitates adjacent serial placement on the assembly line 110. Furthermore, the lower half barrel section 118 and upper half barrel section 116 are arranged from fore to aft, or from aft to fore, such that neighboring pairs of sections correspond with neighboring lengthwise portions for joining cylindrically into the fuselage 12.

A set of lower half barrel section 118 and upper half barrel section 116 are indexed 203 at the first assembly line 110. As discussed above, indexing conveys a 3D characterization of a portion of the lower half barrel section 118 and upper half barrel section 116 that is within the purview 114-1 of each work station 114 and may be performed via physical coupling to the manufacturing excess located indexing feature, scanning manufacturing excess located bar code, reading an RFID chip located on the manufacturing excess, or other means. Indexing also conveys the model of the lower half barrel section 118 and upper half barrel section 116 to each work station 114.

Stations 114 perform 204 work on the first set of lower half barrel sections 118 and upper half barrel sections 116 at the first assembly line 110. This may comprise indexing the lower half barrel sections 118 and upper half barrel sections 116 to the work stations 114, and performing work such as layup, hardening, demolding, frame installation, window manufacturing excess cut-out, door manufacturing excess cut-out operations, etc. In an embodiment where the lower half barrel section 118 and upper half barrel section 116 are advanced by micropulse 129, the work may be performed during pauses between micropulses 129 and/or during micropulse 129. In embodiments where the lower half barrel section 118 and upper half barrel section 116 are continuously moved, the work may be performed while the lower half barrel section 118 and upper half barrel section 116 are moving in process direction 199. Lower half barrel section 118 and upper half barrel section 116 are attached 210 together into full barrel sections (e.g., 44-5) at the end of each of the assembly lines 110.

A variety of additional steps are described that are taken to form other cylindrical full barrel sections (e.g., 44-1 through 44-4) in addition to those steps recited above. A set of upper half barrel sections 126 and lower half barrel sections 128 of fuselage are advanced 206 in the process direction 199 along the second assembly line 120. Track 122 has a drive system to advance lower half barrel section 128 and upper half barrel section 126 along the track 122. This may be performed in a synchronous pulsed fashion, where the lower half barrel section 128 and upper half barrel section 126 are serially advanced by micropulse 129 and then paused or as part of a continuously moving process. The lower half barrel section 128 and upper half barrel section 126 are fabricated in alternating fashion, such that lower half barrel section 128 and upper half barrel section 126 that form the same full barrel section (e.g., 44-2) are adjacent on the assembly line 120.

Furthermore, the lower half barrel section 128 and upper half barrel section 126 are arranged from fore to aft, or from aft to fore, such that neighboring pairs of lower half barrel section 128 and upper half barrel section 126 correspond with neighboring lengthwise portions for joining into a non-cylindrical full barrel section (e.g., 44-5). This enables full barrel sections 44-1 through 44-5 to be circumferentially joined to form most of the fuselage 12. For example, this may comprise assembling lower half barrel sections 128 and upper half barrel sections 126 together to form a full barrel section (e.g., 44-2) by longitudinally joining upper sections 126 to lower half barrel sections 128, for example, at door surround splice or window surround splice.

Work stations 124 perform 208 work on the set of lower half barrel sections 128 and upper half barrel sections 126 at the second assembly line 120. This may comprise indexing the lower half barrel sections 128 and upper half barrel sections 126 to the work stations 124, and performing work such as layup, hardening, demolding, frame installation, window cut-out operations, etc. In an embodiment where the lower half barrel sections 128 and upper half barrel sections 126 are advanced by micropulse 129, the work may be performed during pauses between micropulses 129 and/or during the micropulse 129. In embodiments where the lower half barrel sections 118 and upper half barrel sections 116 are continuously moved, the work may be performed while the lower half barrel section 118 and upper half barrel section 116 are moving in process direction 199.

Lower half barrel section 128 and upper half barrel section 126, are attached 210 or otherwise joined together into full barrel sections (e.g., 44-2). For example, this may comprise assembling lower half barrel sections 128 and upper half barrel sections 126 together to form a full barrel section (e.g., 44-2) by longitudinally joining lower half barrel sections 128 to upper half barrel sections 126, as well as addressing any door surround splices and/or window surround splices. The full barrel sections (e.g., 44-1 through 44-5) of the airframe may then be assembled from fore-to-aft (or from aft-to-fore) with circumferential joining. That is, the full barrel sections (e.g., 44-1 through 44-5) are attached 212 together (e.g., via circumferential/hoopwise joins) in order to form most of a fuselage 12.

Method 200 provides a technical benefit over prior systems and techniques, because it enables airframes to be fabricated in a manner that is efficient in terms of both time and space. Method 200 provides greater access to the lower half barrel sections 128 and upper half barrel sections 126 as well as to lower half barrel sections 118 and upper half barrel sections 116 during assembly than prior full barrel assembly methods. This method permits bringing the lower half barrel sections 128 and upper half barrel sections 126 as well as lower half barrel sections 118 to upper half barrel sections 116 to the work station, the tooling, and the technicians through roughly unfettered access to the IML 60 (FIG. 1).

Prior assembly methods require tools, tooling and technicians to enter the barrel sections through barrel ends or doorways. The tooling and tools have to be set up in place within the full barrel section. When work is completed, the tooling, tools and technicians have to be transported out through barrel ends or doorways. Micropulsing 129 lower half barrel sections 128 and upper half barrel sections 126 as well as lower half barrel sections 118 to upper half barrel sections 116 through work stations 124 and 114, respectively, brings the structure to the technicians, tools and tooling saving all of the non-value added work (e.g., tool, tooling and technician transport in, setup, break down and transport out time.)

Furthermore, delays in fabrication become easy to visually identify, based on the position of a section relative to other sections on the line. Newly fabricated full barrel sections (e.g., 44-1 through 44-5) of fuselage 12 may be immediately assembled together into in-progress airframes, and continuous line assembly techniques allow for full barrel sections 44 to be rapidly constructed from upper half barrel sections 116 and lower half barrel sections 118, and upper half barrel sections 126 and lower half barrel sections 128 (or other sections of fuselage). Still further, the continuous line assembly techniques discussed herein enable processes which are largely similar between upper half barrel sections 116 and lower half barrel sections 118 to be rapidly performed on both upper half barrel sections 116 and lower half barrel sections 118 in series on the same assembly line 110. Similarly, the continuous line assembly techniques enable largely similar processes to be rapidly performed on both upper half barrel sections 126 and lower half barrel sections 128 in series on the same assembly line 120.

FIG. 5 illustrates a detailed portion of assembly environment 100 of FIG. 2 and will be referred to herein as fabrication system 300. Fabrication system 300 utilizes parallel and serial assembly lines for processing upper half barrel sections 116, 126 and lower half barrel sections 118, 128 in an illustrative embodiment. For brevity and clarity, reference numbers introduced with respect to assembly line 120 and assembly region 190 will be used, but the described embodiments are relevant to assembly line 110 and assembly region 180 as well.

Specifically, FIG. 5 illustrates a region where an assembly line 120 that includes work stations 124 which perform work on both lower half barrel sections 128 and upper half barrel sections 126. Post assembly line 120 work is split into assembly stages 321 and 331 for upper half barrel sections 126 and lower half barrel sections 128, respectively. Assembly stages 321 and 331 are static full pulse locations for performing work such as installing a floor grid 365 or a crown module 364, respectively. Assembly stages 321 and 331 correspond, for example, to a floor grid attach station and a crown module attach station. These assembly stages 321 and 331 include work stations 322 and 332, which perform specialized operations specifically dedicated to upper half barrel sections 126 and lower half barrel sections 128.

While at assembly line 120, the lower half barrel sections 128 and upper half barrel sections 126 are advanced along a track 122, such as a series of discretized stanchions and/or rollers. The lower half barrel sections 128 and upper half barrel sections 126 may be driven via Autonomous Guided Vehicles (AGVs) along the track 122, or the rollers (not shown) of the track 122 may themselves be driven via motors (not shown).

Furthermore, work stations 124 dedicated to window, door manufacturing excess and/or bearing edge manufacturing excess trim and/or removal include work station ingress ports 165-2, and egress ports 165-3 (see FIG. 3). Examples of egress ports 165-3 include chutes 398 where trimmed material is removed from assembly line 120. The chutes 398 each represent a start to an output feeder line that removes material/scrap/debris from the assembly line 120. Chutes 398 are capable of tracking manufacturing excess with attached bar codes or RFID tags out of the work station 124 within using optical scanners and/or RFID scanners. The material/scrap/debris may be generated by subtractive manufacturing at one or more of the work stations 124 dedicated to window manufacturing excess removal and one or more work stations 124 dedicated to door manufacturing excess removal and one or more work stations dedicated to bearing edge manufacturing excess removal.

Referring to prior figures, multiple work station ingress ports 165-2 allow passage of feeder line 396 supplied frames 146 and window surrounds 145 and door surrounds 145-1 to work stations 124 along with tooling, tools and technicians. Multiple egress ports 165-3 track removal of material/scrap/debris from the work station 124 through chute 398. Therefore, the path traveled by the lower half barrel sections 128 and upper half barrel sections 126 is different from that of the removed material, feeder line 359 fed frames 146, tools, tooling or technicians. More specifically, ingress ports 165-2 track passage of feeder line 359 supplied frames 146, window surround 145 and door surround 145-1 with attached bar codes or RFID tags to work stations 124 along with tooling, tools and technicians with attached bar codes or RFID tags using optical scanners and/or RFID scanners coupled to the ingress port 165-2 of a particular work station 124.

In assembly line 120, the lower half barrel section 128 is processed before its corresponding upper half barrel section 126 in a process direction 199. Further directional transitions of the upper half barrel sections 126 and lower half barrel sections 128 are indicated by paths, illustrated as arrows, which will be further described. Lower half barrel sections 128 exit the assembly line 120 (which utilizes the micropulse 129 before the upper half barrel sections 126 that they will be joined to form the full barrel sections 44. In continuous assembly lines, the lower half barrel sections 128 and upper half barrel sections 126 continuously move at a desired rate without pausing. This order of operations in this embodiment is the lower half barrel sections 128 receive more labor-intensive and time-consuming work installing the separate cargo floor grid 324 and passenger floor grid 326 (which make up the floor grid 365) than the upper half barrel sections 126 where a single crown module 364 is installed.

Feeder lines 366-1 through 366-4 provide components 363-1 through 363-4, as illustrated, to the feeder lines 361, 362 that fabricate the crown module 364 and the floor grid 365. The components 363-1, 363-2 may comprise ceiling panels or cargo bins for a crown module 364, while components 363-3, 363-4 may comprise beams and intercostals for a floor grid 365. All of the feeder lines illustrated may have additional feeder lines (not shown) providing JIT fasteners, sealant, or other sub-components. Each feeder line 366-1 through 366-4 operates according to its own takt time, which is different from or the same as the takt time of the lower half barrel section 128 and upper half barrel section 126 through the assembly line 120 work stations 124.

To accommodate for this difference in time taken for specialized operations performed upon lower half barrel section 128 as opposed to upper half barrel sections 126, the lower half barrel sections 128 exit the assembly line 120 prior to the upper half barrel sections 126. This gives the lower half barrel sections 128 additional time (i.e., about twice as long) at the assembly stage 331 during which the corresponding upper half barrel sections 126 continues to travel through the assembly line 120. At assembly stage 331, a lower half barrel section 128 may be held in place to receive work during a full pulse. For example, a lower half barrel section 128 is processed in twice as much time as the upper half barrel section 126 from exit from assembly line 120 to arrival at join station 194.

Join station 194 is a full pulse work cell. Again, the lower half barrel section 128 has floor grid 365 installed and is then inverted from a keel up orientation to a keel down orientation and placed in position for being joined with an upper half barrel section 126 at join station 194. Specifically, this arrangement enables the lower half barrel sections 128 to exit inversion station 560 and the upper half barrel sections 126 to exit the assembly stage 321 at roughly the same time, in order to be ready for joining at the join station 194. In one embodiment, the lower half barrel sections 128 exit before the upper half barrel sections 126, in order to provide time for movement along path 394 and rotation of the lower half barrel sections 128 prior to joining when the half barrel sections are moved along respective paths 392 and 390.

Working back through fabrication system 300, both upper half barrel sections 126 and lower half barrel sections 128 leaving assembly line 120 proceed on path 388. Upper half barrel sections 126 proceed to assembly stage 321 on path 386, while lower half barrel sections 128 proceed to assembly stage 331 on path 384. This ensures that no substantial delay accrues while waiting to assemble a full barrel section 44.

As described above, FIG. 3 depicts multiple feeder lines 361, 362, and 396. Feeder lines 396 feed material such as frames 146, window surrounds 145 and door surrounds 145-1, feeder line 316 feed a crown module 364 and feeder line 362 feed floor grids 365. Feeder line 361 includes an assembled crown module 364 for installation into an upper half barrel section 126, and feeder line 362 conveys floor grid 365 including passenger floor grid 326 and cargo floor grid 324, assembled and ready for installation, completed or nearly complete, into the lower half barrel section 128. Door surrounds 145-1, window surrounds 145, frames 146 and other subcomponents are fed via the feeder lines 359 into work stations 124.

Additional feeder lines feed fasteners and sealant. For example, fastener feeder lines 380 feed assembly line 120 in multiple locations as well as assembly stages 321 and 331. Sealant feeder lines 382 feed assembly line 120 in multiple locations as well as assembly stages 321 and 331. Fastener feeder lines 380 and sealant feeder lines 382 are all configured and operated to provide for just-in-time (JIT) delivery and insertion into work stations 124 and assembly stages 321 and 331.

In a further embodiment, gaps 121 are placed into assembly line 120 that utilize the micropulse 129 where components are moved by less than their length and then paused for short increments of time. Some of the gaps 121 results in gaps in work to be performed by the work station 124 when gap 121 is within purview 124-1. Additionally, the lower half barrel section 128 or upper half barrel section 126 within the purview 124-1 of work station 124 may not need work performed based upon whether the lower half barrel section 128 or upper half barrel section 126 within the purview 124-1 needs the particular work performed by the work station 124.

For instance, window surround or window manufacturing excess cutout stations do little to no work on a lower half barrel section 128 which has no windows whereas upper half barrel section 126 has many windows to be installed. However, a lower half barrel section 128 has a concentration of work requiring a cargo door installation station, including installing surrounds and cutting out a manufacturing excess for door cut outs, while the upper half barrel section 126 does not have a cargo door installation. Further, physical gaps 121 between the upper half barrel sections 126 and lower half barrel sections 128 progressing serially down an assembly line 120 also provide work station 124 assembly work relief when the gap 121 reaches each individual work station 124. The gaps 121 discussed herein enable planned work station 124 maintenance and/or technician break time to be performed. It is possible that technicians performing maintenance are not the same as the technicians working on the upper half barrel sections 126 and lower half barrel sections 128 while in purview 124-1 of work station 124.

Figure 6:
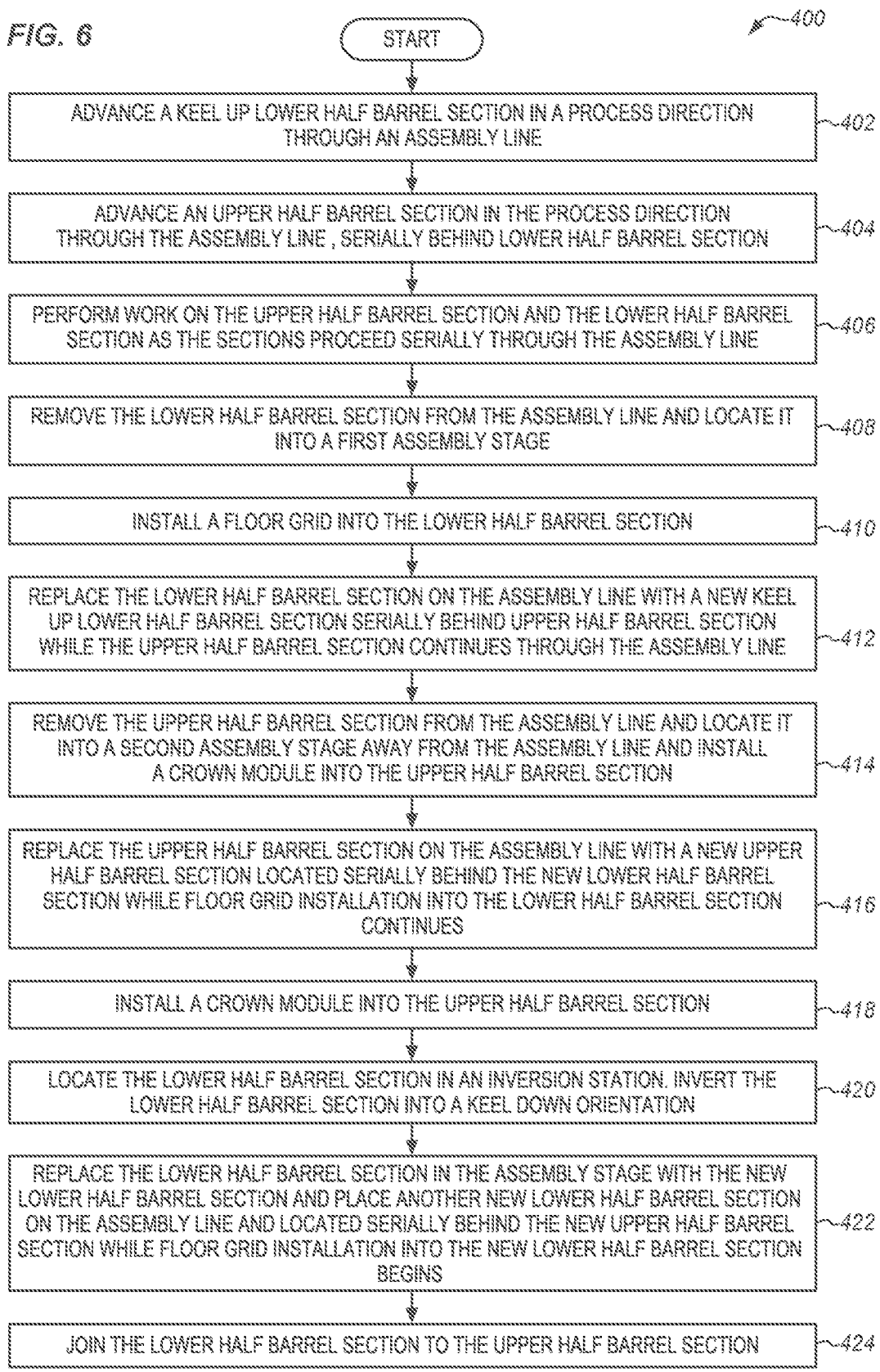
FIG. 6 is a flowchart depicting a method for utilizing the hybrid fabrication system of FIG. 5 in an illustrative embodiment.

FIG. 6 is a flowchart depicting a method 400 for utilizing the hybrid fabrication system 300 of FIG. 5 in an illustrative embodiment. Method 400 includes advancing 402 a keel up lower half barrel section 128 in a process direction 199 through an assembly line 120, such that the lower half barrel section 128 and upper half barrel section 126 advance in series. The lower half barrel section 128 is in a keel up position as it advances through work stations 124 and thus has a similar cross-sectional shape and orientation to the succeeding upper half barrel section 126. This enables the upper half barrel section 126 and the lower half barrel section 128 to utilize more common assembly and tooling across the work stations 124. In the event that a work station 124 does not perform work for both upper half barrel sections 126 and lower sections 128 (for instance, window surround install or window manufacturing excess cut out does not apply for a lower half barrel section 128), maintenance or other stand down functions can be performed in lulls when the work stations 124 are not in operation on a particular half barrel section. Furthermore, when a work station 124 is not in use, workers assigned to the work station 124 are placed on break and/or maintenance is performed on the work station 124.

Advancing 402 may comprise driving the lower half barrel section 128 via a motorized track, or via motorized wheels atop of stanchions/pogos placed upon the shop floor, or via an independent means (e.g., a cart or Autonomous Guided Vehicle (AGV)) attached to the lower half barrel section 128. Furthermore, this step may be performed by advancing the lower half barrel section 128, by pulse 123 or a micropulse 129 such as a frame pitch 147 or a multiple or fraction thereof. Indexing and work is then performed by work stations 124 during pauses between the pulse or micropulse 129 or during both the pause and the pulse or micropulse 129. In one embodiment, the lower half barrel section 128 is continuously moved, and indexing and work is performed by work stations 124 during the continuous motion.

Next, an upper half barrel section 126 is advanced 404 in the process direction 199 through the assembly line 120, serially behind and at the same time with the lower half barrel section 128. In some illustrative examples, an upper half barrel section 126 is advanced 404 in the process direction 199 through the assembly line 120, serially behind and at the same time with the lower half barrel section 128, such that the lower half barrel section 128 and the upper half barrel section 126 advance in series through work stations 124. This may be performed in a similar manner to the advancing 402 step described above, and may be performed synchronously therewith. For example, driving a track 122 at the assembly line 120 may cause both the lower half barrel section 128 and the upper half barrel section 126 to move in unison. Thus, in one embodiment, the assembly line 120, and potentially assembly stages 321 and stage 331 include a track 122 that periodically full pulses or micropulses 129 the lower half barrel section 128 and/or the upper half barrel section 126 in the process direction 199. The sections may be arranged in alternating upper half barrel sections 126 and lower half barrel sections 128 such that pairs of these sections later form the full barrel sections 44 when longitudinally joined, in a specific sequence, to form a fuselage 12 for an aircraft 10. Alternatively, the lower half barrel sections 128 and the upper half barrel sections 126 are arranged such that lower half barrel section 128 and the upper half barrel section 126 for a first aircraft 10 or a first model of aircraft are immediately followed by sections for another aircraft or another model of aircraft.

Continuing, work is performed 406 on the upper half barrel section 126 and the lower half barrel section 128 as the sections proceed serially through the assembly line 120. work stations 124 perform 406 work on the upper half barrel section 126 and the lower half barrel section 128 as they proceed through the work stations 124 of assembly line 120. The work stations 124 at the assembly line 120 may perform work such as composite layup, installing of frames, trimming of manufacturing excess, installing of window surrounds, installing of door surrounds, cutting out for windows, and cutting out for doors, etc. The upper half barrel section 126 and lower half barrel section 128 are joined into full barrel section 44, and may be intended for joining in a subsequent step discussed below.

In one embodiment, during this process, the lower half barrel section 128 and the upper half barrel section 126 are periodically advanced by a full pulse or a micropulse 129 (e.g., synchronously) by a track 122 or other component in the process direction 199 through the assembly line 120, and work on the upper half barrel section 126 and the lower half barrel section 128 is performed 406 during pauses between full pulses or micropulses 129 and/or during the full pulse or micropulse 129 as well. In a further embodiment, the lower half barrel section 128 and the upper half barrel section 126 are continuously moved in the process direction 199 through the assembly line 120, and work on the upper half barrel section 126 and the lower half barrel section 128 is performed 406 while the lower half barrel section 128 and the upper half barrel section 126 are continuously moved.

The lower half barrel section 128 is removed 408 from the assembly line 120 and located into a first assembly stage. This may comprise diverting the lower half barrel section 128 via a switching station 378 (shown in FIG. 5) where the lower half barrel section 128 is advanced by a full pulse along path 384 to the assembly stage 331. The progression of lower half barrel section 128 along path 384 is a lateral translation, through other than a lateral translation is contemplated.

A floor grid is installed 410 into the lower half barrel section. In some illustrative examples, continuing with the lower half barrel section 128, a floor grid 365 is installed 410 into the lower half barrel section 128 while the upper half barrel section 126 continues to full pulse or micropulse 129 through the assembly line 120. Installing the floor grid 365 may be performed by work stations 332 while the lower half barrel section 128 remains inverted (i.e., oriented keel-up). Further contemplated is the installing 410 of the floor grid 365 with two floor levels including the cargo floor grid 324 and the passenger floor grid 326 to the lower half barrel section 128. In one embodiment, the floor grid 365 is pre-assembled such that the cargo floor grid 324 and the passenger floor grid 326 are installed 410 into the lower half barrel section 128 in a single operation. In further embodiments, the cargo floor grid 324 and the passenger floor grid 326 are separately installed 410 within the lower half barrel section 128.

The installation 410 of floor grid 365 begins while the corresponding upper half barrel section 126 is still progressing through the assembly line 120 work stations 124. In preparation, the floor grid 365, and more particularly the cargo floor grid 324 and the passenger floor grid 326 are being assembled, or at least partially assembled, before the lower half barrel section 128 arrives at assembly stage 331 of FIG. 5. As described above, the cargo floor grid 324 and the passenger floor grid 326 are assembled in feeder lines 366-3, 366-4, advancing at a full pulse or micropulse 129 prior to being placed into feeder line 362 for eventual placement into work station(s) 332. An embodiment has multiple work stations 332 as a component of assembly stage 331 which is a fixed cell.

The lower half barrel section is replaced 412 on the assembly line with a new keel up lower half barrel section serially behind upper half barrel section while the upper half barrel section continues through the assembly line. Referencing the depiction of FIG. 5, now that the lower half barrel section 128 has been removed 408 from assembly line 120, and advanced to assembly stage 331, it is replaced 412 with a new keel up lower half barrel section 128 at the beginning of assembly line 120.

The upper half barrel section 126 is removed 414 from the assembly line 120 and located it into a second assembly stage away from the assembly line 120 and install a crown module into the upper half barrel section 126. Similarly, the upper half barrel section 126 passes through the assembly line 120 and work stations 124 as described above, and is then removed 414 from assembly line 120 and then advanced assembly stage 321. In assembly stage 321, operations specific to the upper half barrel section 126 such as crown module installation, etc. are performed.

The upper half barrel section is replaced 416 on the assembly line 126 with a new upper half barrel section located serially behind the new lower half barrel section while floor grid installation into the lower half barrel section continues. With the upper half barrel section 126 removed from assembly line 120, and advanced to assembly stage 321, it is replaced 416 with a new keel up half barrel section 126 at the beginning of assembly line 120. The number of upper half barrel sections 126 and lower half barrel sections 128 within assembly line 120 at a single point in time can vary. Certainly a length of assembly line 120 as compared to the lengths of the upper half barrel section 126 and lower half barrel sections 128 are factor in such a number.

Continuing with method 400, the crown module 364 is installed 418 into the upper half barrel section 126. As described herein, the crown module 364 may be completely assembled or partially completed and are delivered to assembly stage 321 simultaneously, or just before the upper half barrel section 126 arrives at assembly stage 331. As illustrated by FIG. 5, the crown modules 364 are assembled in feeder lines 366-1, 366-2 advancing at a full pulse or micropulse 129 prior to being placed into feeder line 361 for placement into work station(s) 322. An embodiment has multiple work stations 322 as components of assembly stage 321 which is a fixed cell.

Continuing with the method 400, the lower half barrel section 128 is located 420 in an inversion station 560, and the lower half barrel section 128 is inverted into a keel down orientation. In some illustrative examples, the lower half barrel section 128 is located 420 for rotation/inversion into a keel down position which is performed at inversion station 560 via path 394. When the lower half barrel section 128 is within inversion station 560, it is inverted into a keel down position.

The lower half barrel section 128-1 in the assembly stage 330 is replaced 422 with the new lower half barrel section 128 and another new lower half barrel section is placed on the assembly line and located serially behind the new upper half barrel section 126 while floor grid 365 installation into the new lower half barrel section 128-1 begins. The lower half barrel section 128-1 in the assembly stage 330 is replaced 422 with the new lower half barrel section 128 from the assembly line 120 and located serially behind the upper half barrel section 126 while floor grid 365 installation into the new lower half barrel section 128-1 begins. Locate a lower half barrel section 128-4 in the assembly line 120 behind upper half barrel section 126.

To complete the description of the method 400, the lower half barrel section 128 is transitioned from inversion station 560 via path 392 to join station 194. Join station 194 is a full pulse work cell. At substantially the same time, the upper half barrel section 126 is transitioned from assembly stage 321 via path 390 to join station 194. A new upper half barrel section 126 and a new lower half barrel section 128 are placed into the assembly stages 321 and 331. The lower half barrel section 128 is joined to the upper half barrel section 126. The lower half barrel section 128 just removed from inversion station 560 is joined 424 to the upper half barrel section 126 just removed from assembly stage 321 within join station 194 to form a full barrel section 44.

Method 400 provides a technical benefit over prior techniques because it enables rapid fabrication of a full barrel section 44 of fuselage from arcuate sections of fuselage, particularly for sections such as lower half barrel section 128 and upper half barrel section 126, while still enabling the sections of fuselage to share one or more work stations 124 that perform work in a micropulse 129, full pulse or continuous-line environment.

Furthermore, this assembly technique enables easier access to an interior of the lower half barrel section 128 and upper half barrel section 126 being fabricated, because splitting the barrel sections into longitudinal halves allows the structure needing work to be delivered to the purview 124-1 of the work station 124 with its tooling, tools and technicians given roughly unfettered access. Along with indexing, this technique substantially reduces non-value added set up time compared to other methods that bring the tools, tooling and technicians to work location and set up a work station 124 within the full barrel section 44.

As can be understood, setting up work stations within a full barrel section 44 and then moving it within full barrel section 44 to all of the work sites and then breaking it down again for removal is non-value added time during the build process. The arrangement described herein enables as much assembly work as possible to be performed while the fuselage section is in halves, and reduces the amount of assembly work used after joining into a full barrel. This easier access enables easier insertion of tooling for a station, easier inspection, easier worker egress, and easier part egress. This increases the efficiency of work stations represented by work stations 124, 322, and 332. Furthermore, the sequencing lower half barrel section 128 and upper half barrel section 126 ensures that specialized work performed does not delay the fabrication of full barrel sections 44.

Figure 7:
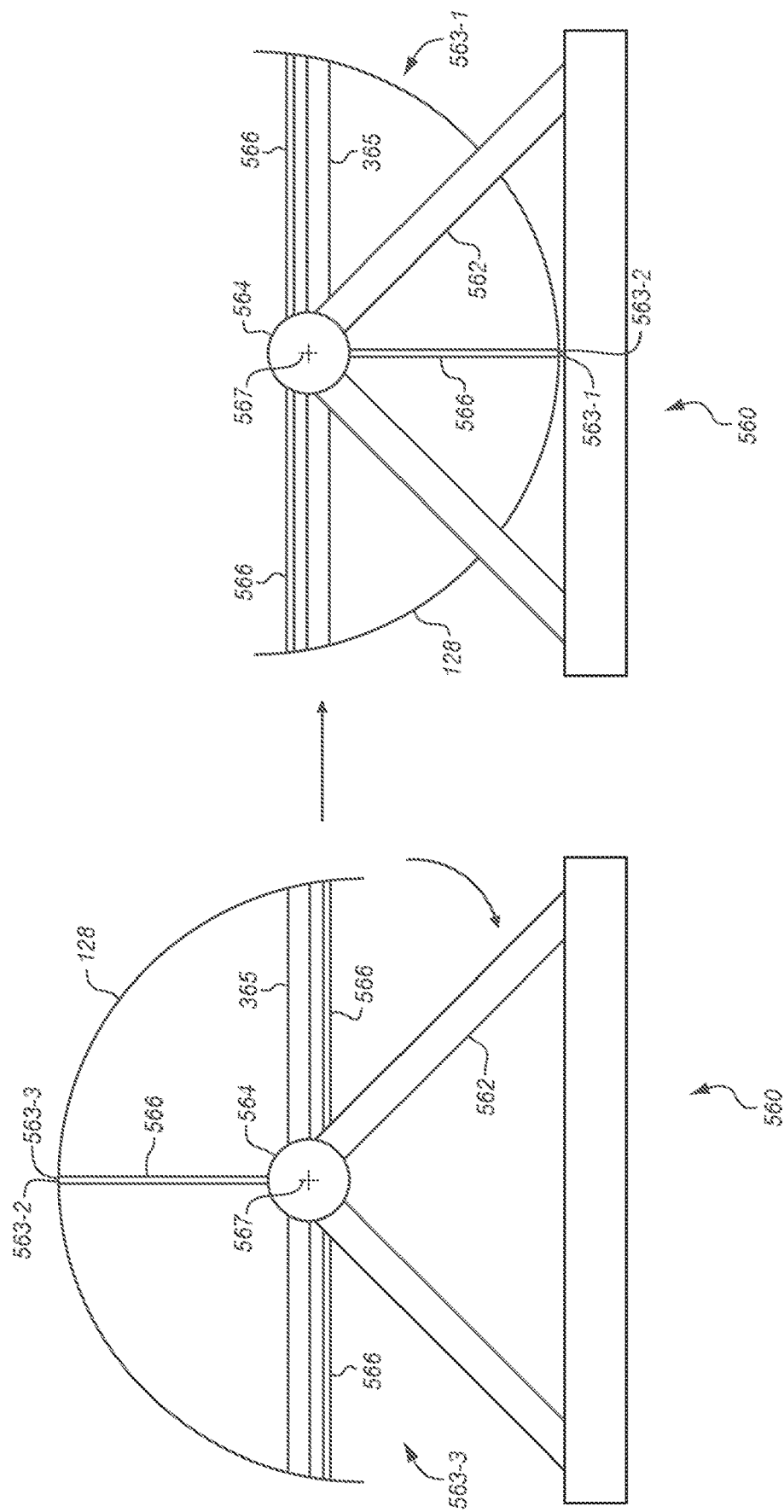
FIG. 7 depicts inversion of a lower section of fuselage in an illustrative embodiment.

As shown in FIG. 7, inversion station 560 rotates the lower half barrel section 128 about a longitudinal center line 567 to place it in a keel down orientation 563-1. More specifically, FIG. 7 depicts inversion of a lower half barrel section 128 in an illustrative embodiment. In FIG. 7, inversion station 560 includes a frame 562, to which a rotary element 564 is attached. The lower half barrel section 128 is rotated about a longitudinal center line 567 prior to joining to the upper half barrel section 126 (shown in FIG. 8). Struts 566 protrude from the rotary element 564 and are attached to lower half barrel section 128, in which one or more floor grids 365 have been installed. The rotary element 564 then rotates, inverting a keel 563-2 of the lower half barrel section 128 from a keel up orientation 563-3 to a keel down orientation 563-1 and arranging the lower half barrel section 128 in position for joining to upper half barrel section 126 in join station 194.

Figure 8:
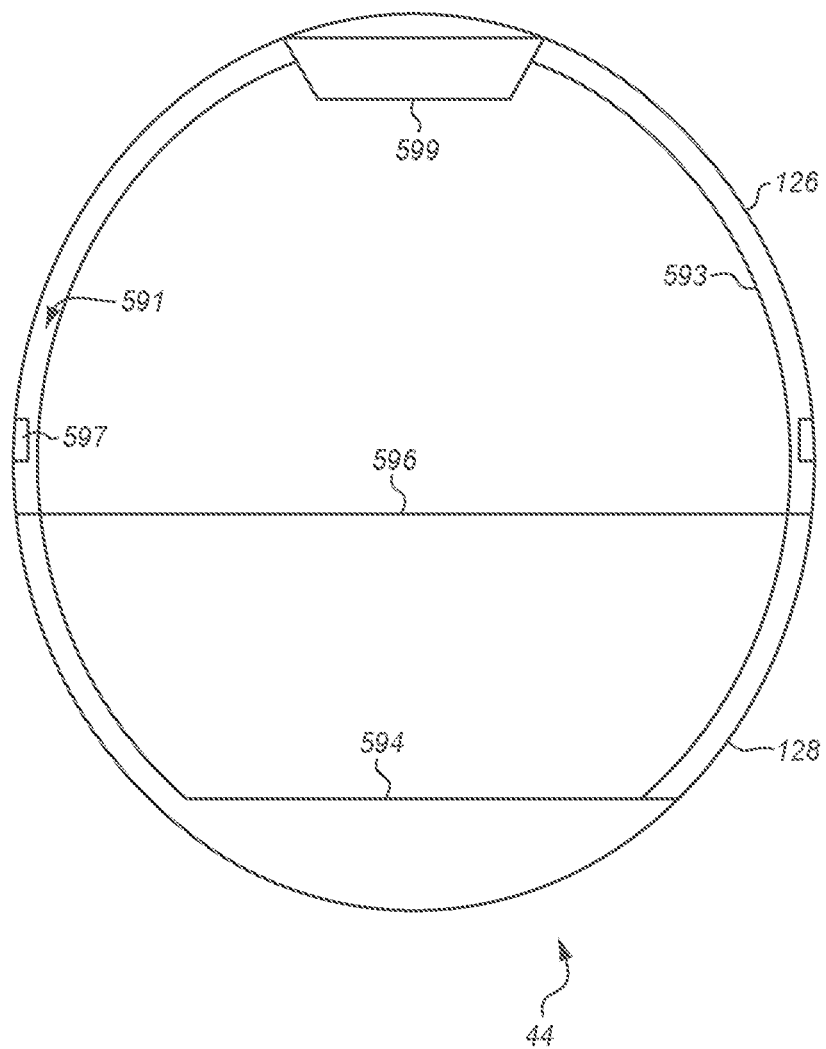
FIG. 8 depicts a cross-section of a fuselage in an illustrative embodiment.

As described elsewhere herein, a join station 194 unites the lower half barrel section 128 to an upper half barrel section 126. This joining process results in the upper half barrel section 126 and the lower half barrel section 128 being longitudinally spliced together, including splicing the skin and the frames 146 and any surrounds thereat. A splice plate (not shown) may be installed entirely in the join station 194. In FIG. 8, a cross-section of a full barrel section 44 in join station 194 is depicted, which includes a cargo floor 594 and a cabin floor 596. FIG. 8 further illustrates that a crown module 599 and doubler 597 have been added to the full barrel section 44 of fuselage. In one embodiment, the crown module 599 includes stow bins and interior lighting, and these details are not shown in FIG. 8 for the sake of clarity. Insulation 591 and interior panels 593 are also shown as being installed.

Figure 9:
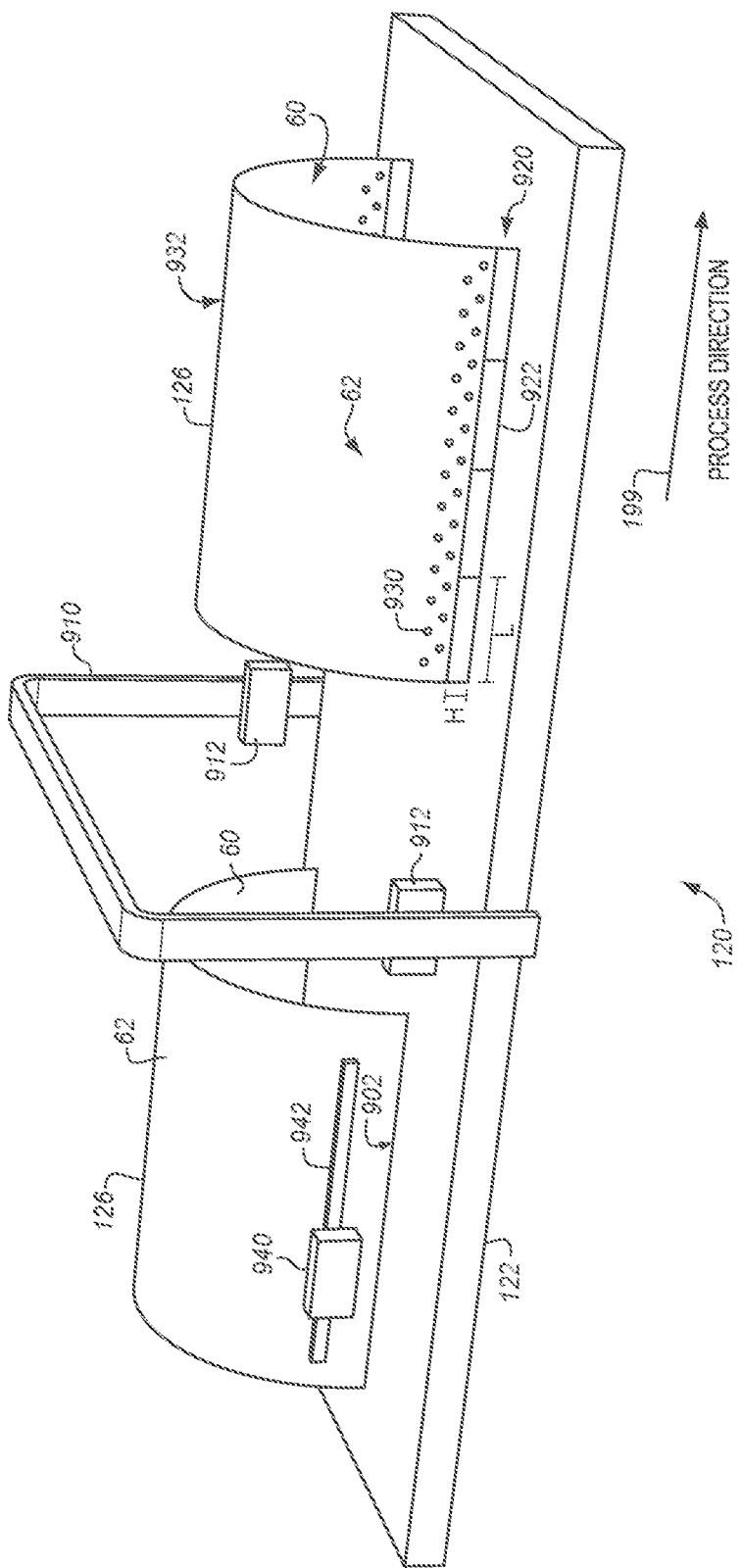
FIG. 9 illustrates installation of a splice plate as an upper half barrel section progresses along an assembly line.
Figure 10:
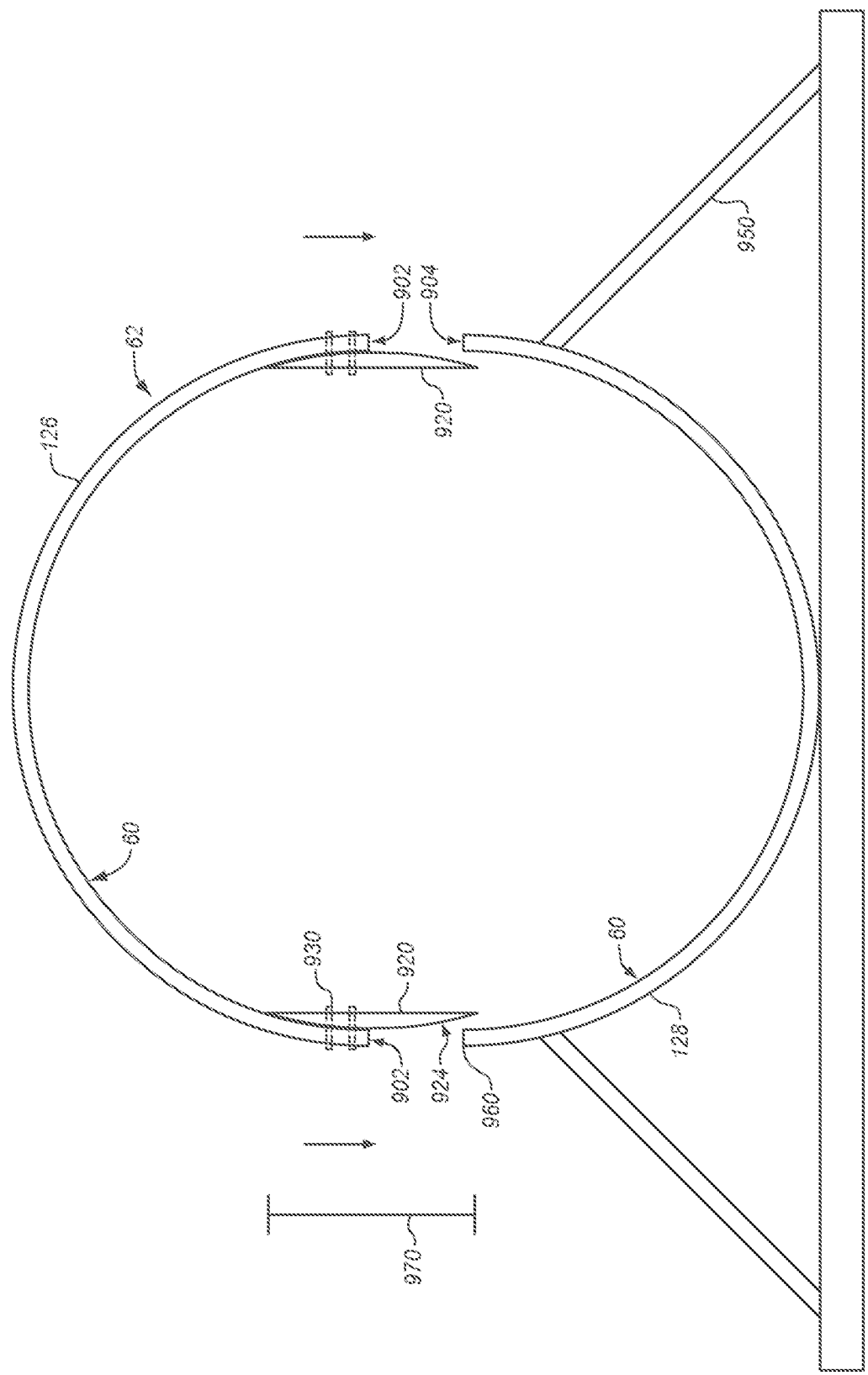
FIGS. 10 and 11 illustrate joining of fuselage half barrel sections utilizing splice plates in an illustrative embodiment.
Figure 11:
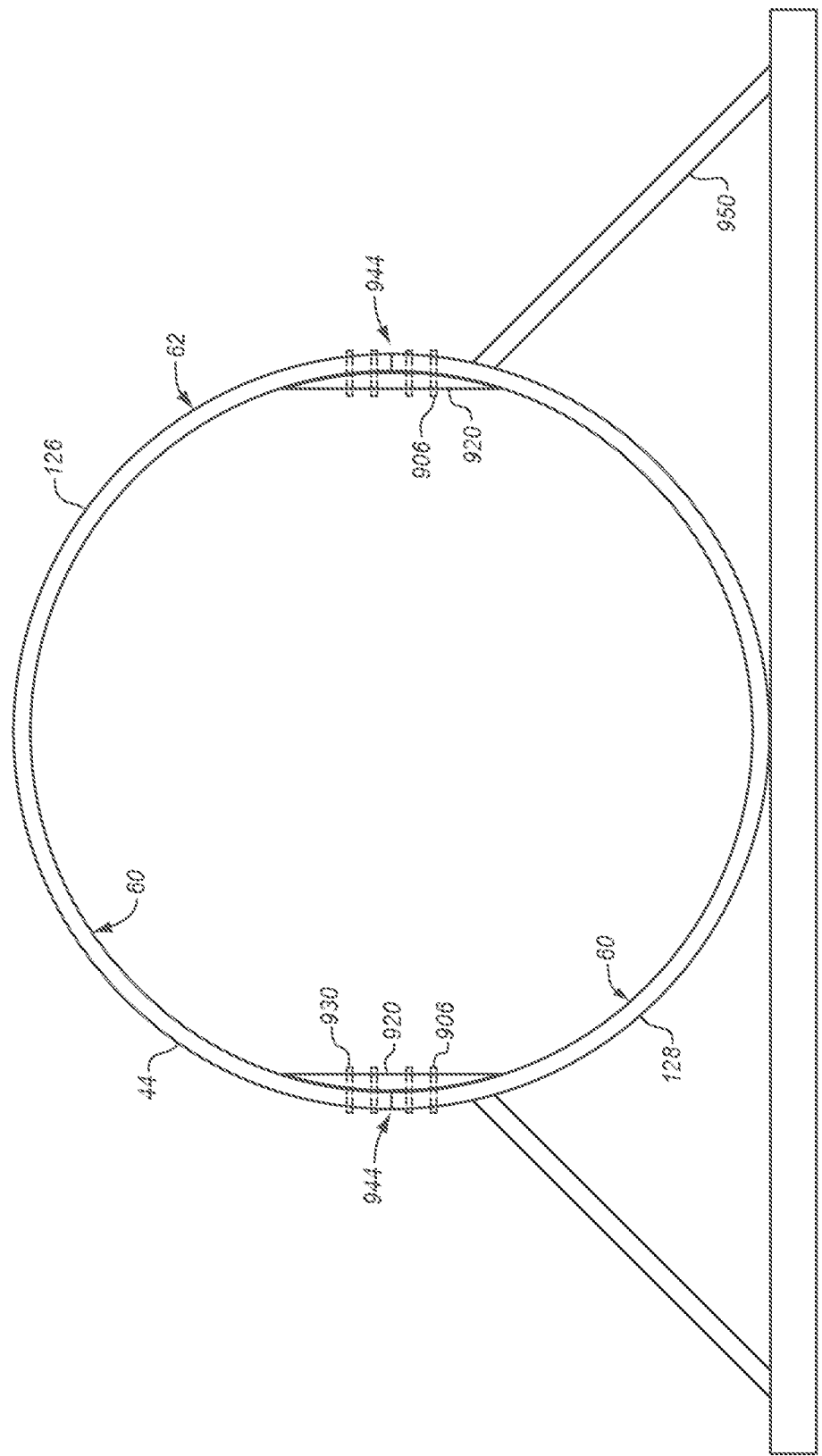

FIGS. 9-11 illustrate in further detail the processes involved in the joining of an upper half barrel section 126 and a lower half barrel section 128. As above, the following description will be with respect to assembly line 120, though it is to be understood that the joining of upper half barrel sections 116 to lower half barrel sections 118 are similar.

In FIG. 9, a portion of assembly line 120 includes a portion of track 122 transports the upper half barrel sections 126 of fuselage having lower boundaries (e.g. boundary 902) in a process direction 199. The assembly line 120 may also be used to transport the lower half barrel sections 128 as described herein, but those are not shown for simplicity of description.

A splicing work station 910 (a specific embodiment of a work station 124) includes end effectors 912 and/or tooling that align segments 922 of a splice plate 920, and install fasteners 930 through the splice plate 920 and the upper half barrel section 126. Specifically, the splicing work station 910 installs the splice plate 920 at each side of an arc (e.g., IML 60) defined by the upper half barrel section 126. The segments have a length L and a height that protrudes by a distance H from the lower boundary 902 of the upper half barrel sections 126. During installation, the splice plate 920 is held in contact with an IML 60 of the upper half barrel sections 126. After installation, a height of the track 122 may be altered by the distance H, such that an uppermost point 932 of the upper half barrel sections 126 remains constant throughout the assembly line 120. In a further embodiment, the splice plates 920 are on the OML 62 side only or on the IML 60 and the OML 62. Any of these configurations is possible via operations of an end effector 912 of the splicing station 910.

In further embodiments, flex track devices 940 that follow a track 942 are removably installed onto the upper half barrel sections 126 and install splice plates 920 while a crown module 364 is being installed in assembly stage 321. In another embodiment, flex track devices 940 that follow a track 942 that is removably installed onto lower half barrel sections 128 and the splice plates 920 are installed while a cargo floor grid 324 and passenger floor grid 326 are being installed in assembly stage 331. In yet another embodiment, flex track devices 940 follow a track 942 that has been removably installed and spans a splice zone, and the splice plates 920 are installed while the upper half barrel section 126 is being joined to the lower half barrel section 128 in join station 194.

In any of these embodiments, the flex track device 940 moves relative to the upper half barrel section 126 and/or lower half barrel section 128 no matter if such sections are stationary, pulsing, micro-pulsing or continuously moving. In any of the embodiments, the flex track device drills the holes and installs the fasteners and moves relative to the upper half barrel sections 126 and/or lower half barrel sections 128. The track 942 is stationary while the flex track device 940 operates as a drill and fastener install device that moves longitudinally upon track 942. The track 942 is placed straddling the splice zone and then the drill and fastener install device (e.g., flex track device 940) traverses the track 942 to drill holes and install fasteners to join the splice plate 920. The splice plate 920 can be installed on the OML 62 or the IML 60, or as part of a longitudinally aligned stringer straddling the splice zone (not shown).

FIG. 10 is an end view of an upper half barrel section 126 prepared and positioned for joining to a lower half barrel section 128 using splice plates 920. FIG. 10 corresponds with FIG. 11, and FIG. 11 illustrates the upper half barrel section 126 and lower half barrel section 128 joined together using a butt splice 944. According to FIG. 10, the splice plate 920 includes a contour 924 that contacts an IML 60 of the upper half barrel section 126, and an IML 60 of the lower half barrel section 128. The splice plate 920 is held in place at the upper half barrel section 126 via fasteners 930. An embodiment has the splice plate 920 finally fastened to the upper half barrel section 126, but another embodiment has the splice plate 920 tack fastened into place. Yet another embodiment has the splice plate 920 finally fastened to the lower half barrel section 128, but another embodiment has the splice plate 920 tack fastened to the lower half barrel section 128. Still another embodiment has the splice plate 920 fully installed in join station 194. The lower half barrel section 128 is held in a lower cradle 950. The splice plate 920 also facilitates alignment with upper half barrel section 126 while ensuring that the upper half barrel section 126 is in a desired contour, at least at a splice point 960, relative to the upper half barrel section 126 during splicing of the splice plate 920 into place, as a part of joining. Lower cradle 950 mechanically supports the lower half barrel section 128.

In further embodiments, an upper cradle (not shown) is used together with the lower cradle 950 (referred to herein as a "lower cradle"). The lower cradle 950 also facilitates longitudinal rotation of lower half barrel section 128 prior to join with upper half barrel section 126. The lower cradle 950 is therefore used for both rotation and joining. The upper cradle (not shown) and lower cradle 950 are indexed to each other via complementary cup and cone or similar systems mounted upon the cradles. That is, one cradle utilizes cups while the other uses complementary cones, at a plurality of locations. The cradles are dimensioned to provide enough clearance from the splice zone 970 to permit the butt splice 944 to be fabricated. The clearance is located on the OML 62 and the IML 60. The clearance therefore permits splice plate 920 install, frame splices, window/door surround splices, and other splices discussed herein.

In FIG. 11, the upper half barrel section 126 has been placed into a butt splice arrangement such that upper boundary 904 of lower section 128 contacts a lower boundary 902 of upper half barrel section 126. Fasteners 906 have been installed to complete joining of the upper half barrel section 126 and the lower half barrel section 128 resulting in a full barrel section 44. An embodiment has join station 194 attach the splice plate 920 by driving fasteners through the splice plate 920 while the splice plate 920 contacts an IML 60 of the upper half barrel section 126 and an IML 60 of the lower half barrel section 128. The splice plate 920 could be installed upon either the upper half barrel section 126 or the lower half barrel section 128 prior to the join station 194, or while within the join station 194. An embodiment has the splice plate 920 installed as part of the upper half barrel section 126 in assembly line 120 or alternatively installed upon the lower half barrel section 128 within assembly line 120. The splice plate 920 is shown with an exaggerated curved structure in FIGS. 10 and 11 to match an exaggeratedly small radius of the full barrel section 44.

In a further embodiment, the method of joining the upper half barrel section 126 to the lower half barrel section 128 is similar to that described above, but the upper half barrel section 126 and the lower half barrel section 128 both advance to the join station 194. The upper half barrel section 126 and the lower half barrel section 128 are aligned for joining in the join station 194, and splice plate(s) 920 are installed onto the upper half barrel section 126 and/or the lower half barrel section 128 to form a butt splice 944 either via bonding and/or via multiple rows of fasteners and fay surface sealing.

Each frame 146 is also butt spliced together with a splice plate dedicated to each frame 146 in join station 194. This results in the upper half barrel section 126 and the lower half barrel section 128 being longitudinally spliced together, including splicing the skin 911 and the frames 146 and any door and/or window surrounds thereat. Join station 194 can also be configured to perform installation of any electrical or plumbing in the join area and installation of insulation and wall panels in the join zone.

Figure 12:
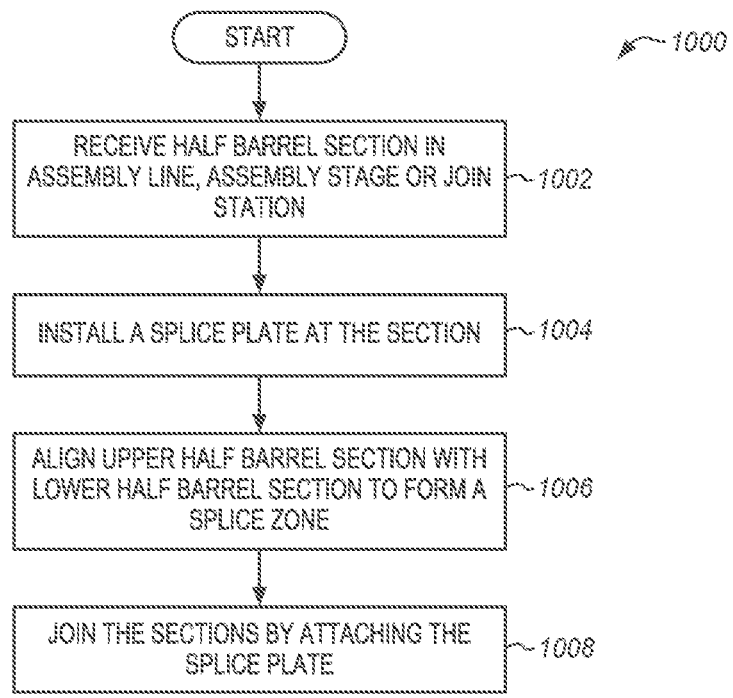
FIG. 12 is a flowchart depicting a method of installing splice plates for joining fuselage sections in an illustrative embodiment.

FIG. 12 is a flowchart depicting a method 1000 of installing splice plates 920 for joining fuselage sections in an illustrative embodiment. The splice plates 920 may be composite or aluminum. If aluminum, the splice plates 920 are fastened and fay surface sealed and otherwise sealed to avoid galvanic issues when affixed to lower half barrel section 128 and upper half barrel section 126 and other composite materials. Composite splice plates 920 are bonded and/or fastened into place.

Method 1000 includes receiving 1002 a half barrel section in assembly line 120, assembly stage or join station. Continuing to utilize assembly line 120 as the illustrative example, method 1000 includes receiving 1002 an upper half barrel section 126 in assembly line 120, assembly stage or join station. As understood, method 1000 applies to upper half barrel sections 116, as well as lower half barrel sections 118, 128, assembly line 110, assembly stages 320, 321, 330, 331 (as appropriate) and/or join station 194.

A splice plate 920 is installed 1004 at the section. The section can take the form of an upper half barrel section 126 or a lower half barrel section 128. In some illustrative examples, the splice plate 920 is installed 1004 upon the upper half barrel section 126. More specifically and in one embodiment, splice plate 920 is installed 1004 in a dedicated work station 124. In another embodiment, the splice plate 920 is installed in the assembly line 120 using a flex track device 940 (FIG. 9) that follows a track 942 removably installed onto the upper half barrel section 126. When the installation of splice plate 920 completed, the flex track device 940 and track 942 are separated and then cycled back up the assembly line 120.

The upper half barrel section 126 exits the assembly line 120 with a splice plate 920 installed on one longitudinal edge or on both and is advanced to assembly stage 321 for crown module 364 install. The other side of the splice plate 920 is fastened to the corresponding lower half barrel section 128 in the join station 194. In another embodiment, splice plate 920 is installed 1004 to both the upper half barrel section 126 and corresponding lower half barrel section 128 entirely within the join station 194. The splice plate 920 is installed 1004 by utilizing multiple rows of fasteners 906 with fay surface sealing and/or bonding.

Installing 1004 a splice plate 920 may comprise installing the splice plate 920 during pauses between micropulses 129, during micropulses 129 or during both pauses between micropulses 129 and during micropulses 129 of the upper half barrel section 126 in the process direction 199 at the assembly line 120. In a further embodiment, the splice plate 920 is installed 1004 during continuous motion of the upper half barrel section 126 in the process direction. Thus, the splice plate 920 is installed 1004 at an assembly line 120 that the upper half barrel section 126 travels through. In a still further embodiment, the splice plates 920 are installed 1004 after the upper half barrel section 126 has exited the assembly line 120 and entered assembly stage 321. In a still further embodiment, installing 1004 the splice plate 920 is performed during installation of a crown module 364 or installation of a cargo floor grid 324 and passenger floor grid 326 into one or both of an upper half barrel section 126 and a lower half barrel section 128, respectively, at the same time.

The splice plate 920 is dimensioned for IML 60 installation 1004. The butt splice 944 itself can include a splice plate 920 disposed at an IML 60 That is, the splice plate 920 is installed onto an IML 60 or is installed partially onto an upper half barrel section 126 and partially onto a lower half barrel section 128. The splice plates 920 can be as long as the half barrel sections 117, 127 discussed above, or some fraction thereof. Multiple splice plates 920 that are longitudinally arranged may be disposed along an entirety of the length of the half barrel sections 117, 127. Furthermore, a splice plate 920 can be longitudinally installed 1004 onto either an upper half barrel section 126 or lower half barrel section 128 before entering a join station 194 as part of the assembly stage 320 or at attach stage 330. Still further, a splice plate 920 can be longitudinally installed straddling splice zone 914 and onto both upper half barrel section 126 and lower half barrel section 128 as part of the work done in join station 194. In still further embodiments, a splice plate 920 operates as a longitudinally running stringer which straddles the splice zone when coupled to the upper half barrel section 126 and the lower half barrel section 128.

The splice described above is a butt splice 944 In yet even more embodiments, the splice plates 920 are lapped to join the upper half barrel section 126 to the lower half barrel section 128 where an overlap exists between the lower half barrel section 128 and upper half barrel sections 126.

The next step of method 1000 includes aligning 1006 the upper half barrel section 126 with the lower half barrel section 128 to form the aforementioned splice zone therebetween. In one embodiment, this comprises aligning the upper half barrel section 126 with a lower half barrel section 128, which is performed while the upper half barrel section 126 remains butted against the lower half barrel section 128 while it is supported by a lower cradle 950 or other device. Thus, the lower half barrel section 128 may be placed in a lower cradle 950 prior to aligning with the upper half barrel section 126. In embodiments where the lower half barrel section 128 is also processed via the assembly line 120, aligning the upper half barrel section 126 with the lower half barrel section 128 may include rotating the lower half barrel section 128 from a vertically inverted orientation from a keel up orientation 563-3 to keel down orientation 563-1 via inversion station 560 previously described.

The sections are joined 1008 by attaching the splice plate. The upper half barrel section 126 and lower half barrel section 128 are joined 1008 by attaching the splice plate 920 within splice zone. In one embodiment, the upper half barrel section 126 is joined to the lower half barrel section 128 by attaching 1008 a second half of the splice plate 920 to the half barrel section where the first half of the splice plate 920 is not already attached. Depending on the materials utilized in fabricating aircraft 10, the splice plate 920 is installed via co-bonding and/or via the installation of fasteners or both to the lower half barrel section 128 and the upper half barrel section 126.

Additionally, to complete the butt splice 944 the frames 146 are spliced together within the splice zone. As illustrated in FIG. 1, each half barrel section 117, 127 includes frames 146 and thus frame splices. Examples include stub frames that join frames 146, and splice plate 920 to the skin of the half barrel section 117, 127. The frames 146 end prior to the frame splices to facilitate placement of splice plate 920 directly against skin within the splice zone. These frame splices are installed on the IML 60 of the upper half barrel section 126 and the lower half barrel section 128 and then the stub frames are installed to connect the frames 146 of the upper half barrel section 126 to the frames 146 of the lower half barrel section 128.

A further benefit is that the length of the frames 146 installed prior to entering the join station 194 facilitates movement of the half barrel sections 117, 127 along a track 112 prior to splicing and joining at the join station 194. It also facilitates installation of splice plates 920. Splice plates 920 are installed in splice zones to couple the skin of the upper half barrel section 126 to that of the lower half barrel section 128. Furthermore, splice plates 920 are designed to occupy an entire length of upper half barrel section 126 and lower half barrel section 128, or some fraction thereof as segments 922.

A splice plate 920 at an IML 60 operates as a longitudinally running stringer to couple to the skin of upper half barrel section 126 to the skin of the lower half barrel section 128. In such an embodiment, skin from each upper half barrel section 126 abuts the skin from the corresponding lower half barrel section 128. In a further embodiment, the skin of the upper half barrel section 126 and the skin of the lower half barrel section 128 overlap as part of a lap splice.

In this embodiment, other components such as electrical, insulation, and plumbing are found in both upper half barrel section 126 and lower half barrel section 128 and/or even partially within splice zone. An upper electrical component is joined to a lower electrical component by an electrical component splice that spans or lies within the splice zones 914. An upper plumbing component is joined to a lower plumbing component by a plumbing component that spans or at least partially lies within the splice zones 914. The plumbing component can be hydraulic (water or hydraulic fluid) and/or pneumatic as a matter of design choice.

Similarly, an upper door surround component is joined to a lower door surround component by a door surround splice that spans or lies within the splice zones. An upper window surround is joined to a lower window surround by window surround splice that spans or lies within the splice zones.

Figure 13:
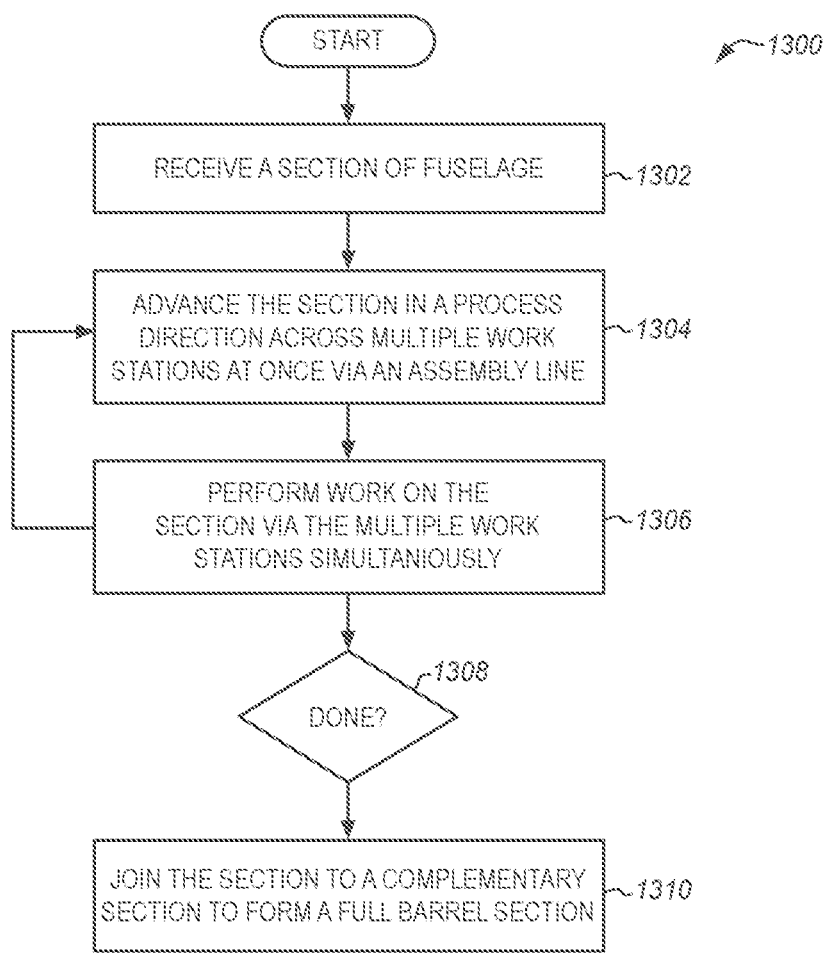
FIG. 13 is a flowchart illustrating a method of working on a single section of fuselage simultaneously via multiple stations on an assembly line in an illustrative embodiment.

FIG. 13 is a flowchart illustrating a method 1300 of working on a single section of fuselage simultaneously via multiple work stations 114, 124 as described herein on an assembly line 110, 120. Method 1300 includes receiving 1302 a section of fuselage. In some illustrative examples, method 1300 includes receiving 1302 a half barrel section 117, 127 (e.g., an upper half barrel section 116, 126 or a lower half barrel section 118, 128). This work may comprise demolding a composite part from a layup mandrel (not shown) and placing the composite part onto a track 122 of an assembly line 120 as discussed above.

The section is advanced 1304 in a process direction 199 across multiple work stations 114, 124 at once via an assembly line. In some illustrative examples, the half barrel section 117, 127 is advanced 1304 in a process direction 199 across multiple work stations 114, 124 at once via an assembly line. This may be performed via driving the half barrel section 117, 127, or by driving a motor that causes the track 122 to advance the half barrel section 117, 127 (e.g., by driving rollers at the track 122). In one embodiment, the half barrel section 117, 127 is advanced in a pulsed manner, while in another embodiment, the half barrel section 117, 127 is moved continuously. As shown in FIG. 5, many of work stations 124 are present along the length of the half barrel section 117, 127 as the half barrel section 117, 127 is advanced. For half barrel section 117, 127 of substantial length (e.g., twenty-five to forty feet), each work station 114, 124 may be separated from other work stations 114, 124 by a distance of a frame pitch (e.g., sixteen to forty inches), and hence many work stations 114, 124 may be disposed for operation. These work stations 114, 124 may include frame installation, window installation, trimming, sealing, Non-Destructive Inspection (NDI) of the half barrel section 117, 127, cleaning, etc. Thus, in one embodiment, advancing the half barrel section 117, 127 comprises moving the half barrel section 117, 127 through the multiple work stations 114, 124, which are separated from each other by distances in the process direction 199.

Work is performed 1306 on the section via multiple stations simultaneously. In some illustrative examples in method 1300, work is performed 1306 on the half barrel section 117, 127 via the multiple work stations 114, 124 simultaneously. That is, each work station 114, 124 may perform 1306 work independently of other work stations 114, 124, yet at the same time as other work stations 114, 124, because the spacing of the work stations 114, 124 ensures that no collisions are possible between work stations 114, 124. The advancing 1304 and performing 1306 steps may be repeated iteratively for a single half barrel section 117, 127 as the half barrel section 117, 127 advances through the serially arranged work stations 114, 124 of the assembly line 110, 120. If additional work is needed, work stations 114, 124 that are part of the assembly line 110, 120 from the start of the serial process perform 1306 the additional work. There is no "on the fly" addition of work stations 114, 124 to the process. If a work station 114, 124 is not needed, then it is not instructed to perform 1306 work upon the half barrel section 117, 127. Furthermore, the steps of receiving 1302, advancing 1304, and performing 1306 may be iteratively repeated for each of multiple half barrel section 117, 127 at the assembly line 110, 120. Completed half barrel section 117, 127 may then be joined to other half barrel section 117, 127 to form a full barrel section 44.

A determination 1308 is made whether the half barrel section 117, 127 has received all desired work at the assembly line 110, 120. That is, the determination 1308 pertains to whether the half barrel section 117, 127 has proceeded successfully through the assembly line 110, 120 to receive all work it was intended to receive therein. It will be understood that the determination 1308 of whether the half barrel section 117, 127 needs a certain number of passes through particular work stations 114, 124 is made well in advance of the start of the processing of the half barrel section 117, 127 through the assembly line 110, 120. The process of determining the number of work stations 114, 124 of a particular type and the takt time is made when an assembly line 110, 120 is created. If all of the work cannot, for whatever reason, be performed 1306 within the assembly line 110, 120, then the work is taken further downstream and performed "out of position". If the work is completed, the half barrel section 117, 127 continues along the assembly line 110, 120 to be is joined 1310 with a complementary half barrel section 117, 127 in order to form a full barrel section 44.

Method 1300 provides a substantial advantage of prior techniques because it enables many work stations 114, 124 to perform work at once on a single half barrel section 117, 127 of fuselage 12, without necessitating a stationary cell for each type of work to be performed. This enhances efficiency and throughput, and reduces space occupied on the factory floor.

Thus, as discussed above, in one embodiment, an assembly line 110, 120 includes a respective track 112, 122 that receives half barrel sections 117, 127 of fuselage 12, and advances those half barrel section 117, 127 in a process direction 199 across multiple work stations 114, 124 at once. The work stations 114, 124 are arranged along the track 112, 122 in the process direction 199 by a distance less than a length of the half barrel section 117, 127, such that at least two of the work stations 114, 124 are enabled to perform 1306 work on a half barrel section 117, 127 simultaneously while the half barrel section 117, 127 proceeds through the work stations 114, 124. For example, the work stations 114, 124 may be separated from neighboring work stations 114, 124 by a distance equal to a frame pitch 147 in the process direction 199.

In a further embodiment, a plurality of the work stations 114, 124 remove material from the half barrel sections 117, 127, or add material (not shown) to the half barrel sections 117, 127. As described elsewhere herein, the half barrel section 117, 127 refer respectively to both upper half barrel sections 116, 126 and lower half barrel sections 118, 128.

Figure 14:
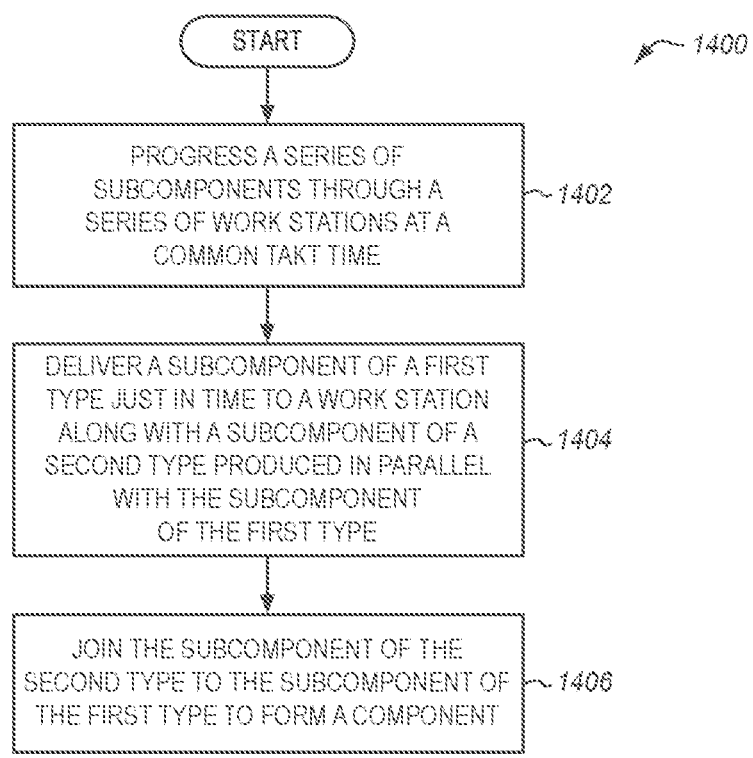
FIG. 14 is a flowchart illustrating a method of takt time assembly in an illustrative embodiment.

While referring to FIG. 3, which describes the methods and systems herein generically, FIG. 14 is a flowchart illustrating a method 1400 of takt time assembly in an illustrative embodiment. Method 1400 includes progressing 1402 a series of subcomponents 162-1, 162-n through a series of work stations 152-1 through 152-n at a common takt time. In some illustrative examples, the work stations can be referred to as fabrication stations. In one embodiment, the subcomponents 162-1, 162-n are delivered according to the common takt time. Thus, the deliveries are provided JIT from a feeder line of 160-1 through 160-n, and each feeder line of 160-1 through 160-n may have a common takt time or not. The feeder lines 160-1 through 160-n may have their own takt time, and this takt time may be equal to a fraction of a fuselage takt time, or not.

The term takt-time needs further explanation. For example, and with reference to FIG. 3, there is a Takt time of Product (TTP) for each assembly line 150, as well as for each feeder line 160-1 through 160-n. The description applies to the other figures described herein, for example assembly lines 110, 120, and feeder lines 149. Often the takt times are same but can be different, as feeder lines 160-1 through 160-n always need to be synchronized with assembly lines 150. For example, if there was only one assembly line 150 and there were eight half barrel sections 117 going down assembly line 150, combined with a product demand requiring eight half barrel sections 117 every 32 available hours, the TTP for the assembly line 150 is 4 hours. The TTP is equal to pulse time only when pulse length is the full length of product produced. In case of a micropulsed line, where pulse length is a fraction of full product length, gaps 121 between products have to be accounted for, and the pulse time (PT) is much less. All feeder lines 160-1 through 160-n need to support mainline TTP, PT, or velocity. As an additional example, if pulse length was equal to a frame pitch 147 (around 2 feet), then a frame feeder line would need to deliver a number of frames 146 (e.g., two) per frame station. On some half barrel sections 117 there may be no doors, so the feeder line needs to supply two frames 146 every pulse time. Some half barrel sections 117 include doors and in those areas, frames 146 are not needed for at least a few micropulses. However, feeder lines 160-1 through 160-n still have to synchronize to assembly line 150 pulse time. The feeder lines 160-1 through 160-n can have greater TTP if the number of products per pulse is greater than one and with only one feeder line. If number of products is greater than one and the number of feeder lines 160-1 through 160-n for that product is same as the number of products in feeder line, then PT of feeder line is same as that of the assembly line 150. When there are no need to supply feeder products to assembly line 150, then PT is variable for the feeder line.

At the feeder lines 160-1 through 160-n additional work stations 152-1 through 152-n perform work on subcomponents 162-1, 162-n during a pause between pulses of the subcomponents 162-1, 162-n in a process direction 199. Some subcomponents 162-1, 162-n may be produced in a continuous non-pulsed, non-micropulsed fashion. Method 1400 includes delivering 1404 a subcomponent of a first type just in time to a work station along with a subcomponent of a second type produced in parallel with the subcomponent of the first type. The subcomponents 162-1, 162-n are delivered to the work stations Just In Time (JIT) in an order of usage. Method 1400 includes joining 1406 the subcomponent of the second type to the subcomponent of the first type to form a component. In one embodiment, the subcomponent is a section (e.g., an upper half barrel section 116, 126 or a lower half barrel section 128) of a fuselage 12. In a further embodiment, the component 170-1 is a full barrel section 44 formed from an upper half barrel section 116, 126 and a lower half barrel section 118, 128.

In further embodiments, the method further includes simultaneously performing work on the subcomponent via more than one of the work stations 152. Depending on the embodiments, progressing comprises iteratively pulsing the subcomponents 162-1, 162-n by less than their length, then pausing while work is performed on the subcomponents 162-1, 162-n. Alternatively, progressing comprises iteratively pulsing the subcomponents 162-1, 162-n at least their length, then pausing while work is performed on the subcomponents 162-1, 162-n. Alternatively, progressing comprises continuously moving the subcomponents 162-1, 162-n while work is performed on the subcomponents 162-1, 162-n. In pulsed embodiments, the first type of subcomponent and the second type of subcomponent are joined into the component 170 at a work station after a pulse.

Figure 15:
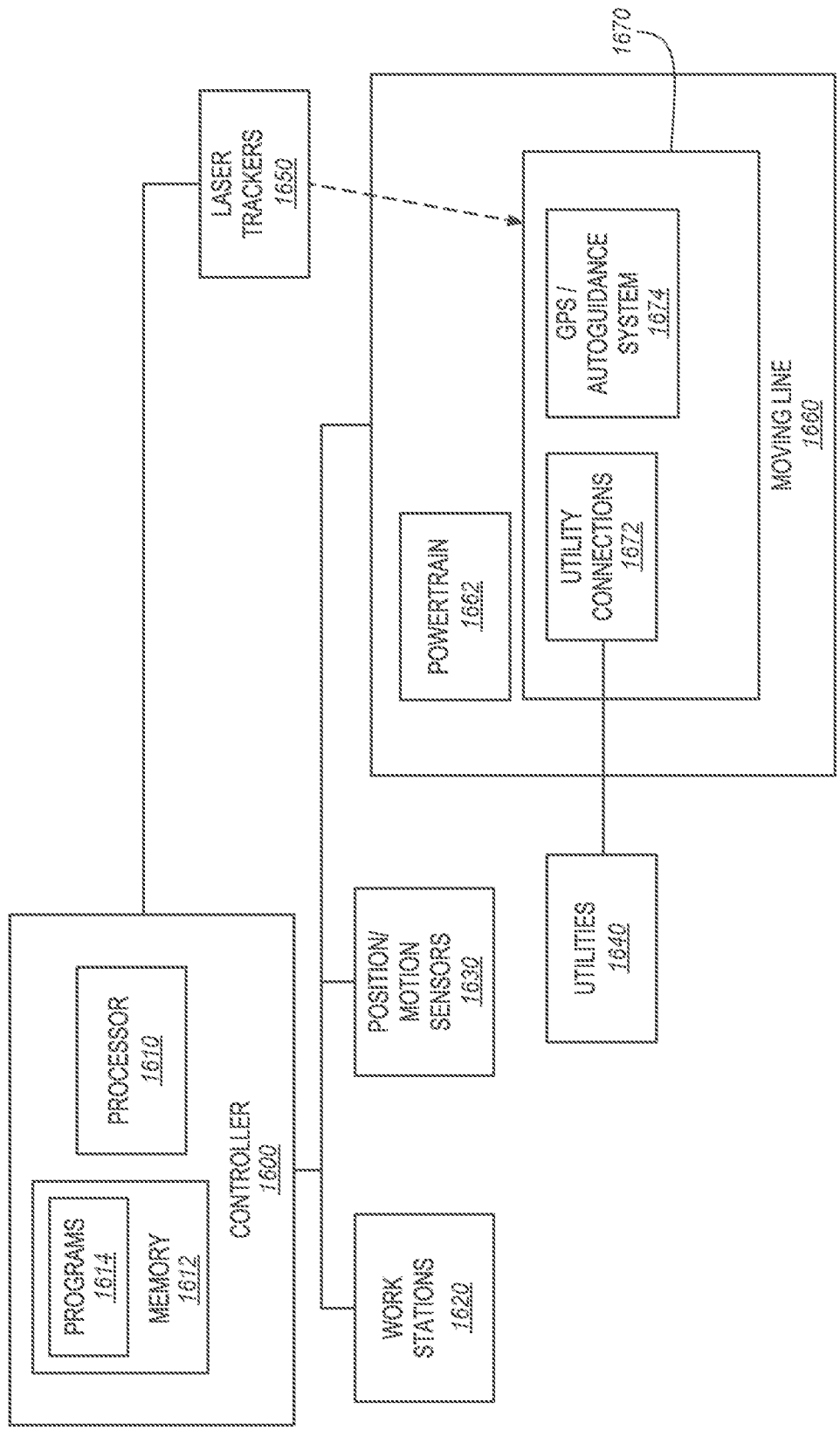
FIG. 15 broadly illustrates control components of a production system in an illustrative embodiment.

Attention is now directed to FIG. 15, which broadly illustrates control components of a production system (e.g., assembly environment 100) that performs continuous manufacturing. A controller 1600 coordinates and controls operation of work stations 1620 (corresponds to any and all of work stations 114, 124, 152-1 through 152-n described herein, and movement of one or more of the aircraft components described herein) along a moving line 1660 having a powertrain 1662. The controller 1600 may comprise a processor 1610 which is coupled with a memory 1612 that stores programs 1614. In one example, the mobile platforms 1670 are driven along a moving line 1660 that is driven continuously by the powertrain 1662, which is controlled by the controller 1600. In this example, the mobile platform 1670 includes utility connections 1672 which may include electrical, pneumatic and/or hydraulic quick disconnects that couple the mobile platform 1670 with externally sourced utilities 1640. In other examples, as previously mentioned, the mobile platforms 1670 comprise Automated Guided Vehicles (AGVs) that include on board utilities, as well as a GPS/autoguidance system 1674. Mobile platforms 1670 also include some or all of the indexing systems, bar codes and RFID systems previously discussed. In still further examples, the movement of the mobile platforms 1670 is controlled using laser trackers 1650. Laser trackers 1650 use indexing units, bar code readers or RFID readers. Position and/or motion sensors 1630 coupled with the controller 1600 are used to determine the position of the mobile platforms 1670 as well as the powertrain 1662.

Figure 16:
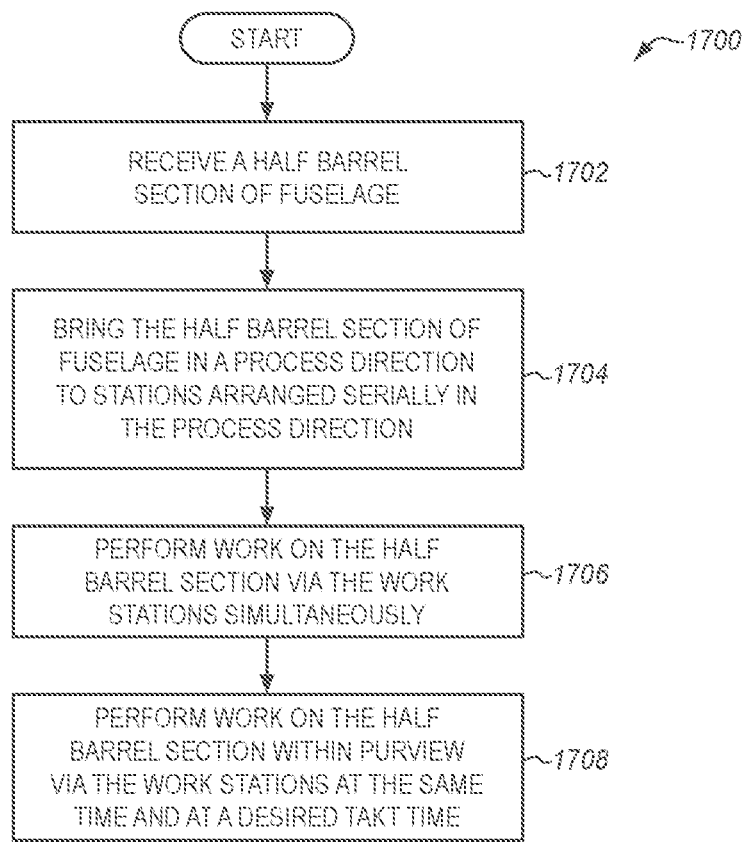
FIG. 16 is a flowchart illustrating a further method of takt time assembly in an illustrative embodiment.

FIG. 16 is a flowchart illustrating a further method 1700 of takt time assembly for fabricating an airframe of an aircraft 10 in an illustrative embodiment. Method 1700 includes receiving 1702 a section of fuselage. In some illustrative examples, method 1700 includes receiving 1702 a half barrel section 117, 127 at an assembly line 110, 120 and placing a bearing edge of the half barrel section 117, 127 onto track 112, 122. Method 1700 continues by bringing 1704 the section of fuselage in a process direction 199 to stations arranged serially in the process direction 199. In some illustrative examples, method 1700 continues by bringing 1704 the half barrel section 117, 127 in a process direction 199 to work stations 114, 124 (including any tools and/or equipment there disposed) arranged serially in the process direction 199. This step brings half barrel section 117, 127 to the tools, tooling and technicians of the work station 114, 124 or multiple work stations 114, 124 at the same time. In one embodiment, bringing the half barrel section 117, 127 to work stations 114, 124 comprises advancing by micropulses 129. The method 1700 includes performing 1706 work on the section via the stations simultaneously. In some illustrative examples, method 1700 includes indexing 1706 the half barrel section 117, 127 within purview 114-1, 124-1 of work stations 114, 124. Work is performed 1708 on the half barrel section 117, 127 within purview 114-1, 124-1 of the work stations 114, 124 at the same time at a desired takt time. The work performed 1708 may comprise any of the various tasks described above. For example, in one embodiment, the work performed 1708 comprises removing material from the half barrel section 117, 127. In another embodiment, the work performed comprises adding material to the half barrel section 117, 127.

In a further embodiment, the method further comprises establishing a takt time for half barrel section 117, 127 within purview 114-1, 124-1 of serially arranged work stations 114, 124. The takt time helps in the determining/selecting of the number of work stations 114, 124 to arrange serially in the process direction 199 for the half barrel section 117, 127, based on: a work rate of each work station 114, 124, a size of the upper half barrel section 116, 126 and lower half barrel section 118, 128, and the takt time. In a still further embodiment, the method comprises selecting a number of work stations 114, 124 to perform the parallel tasks upon the half barrel section 117, 127 based upon the takt time needed for the desired throughput. If two work stations 114, 124 are incapable of installing the needed number of frames 146 for the upper half barrel section 116, for example, within the takt time, a third work station 114, 124 is added to the work stations 114, 124 during conception of the assembly line 110, 120 for installation of frames 146.

Figure 17:
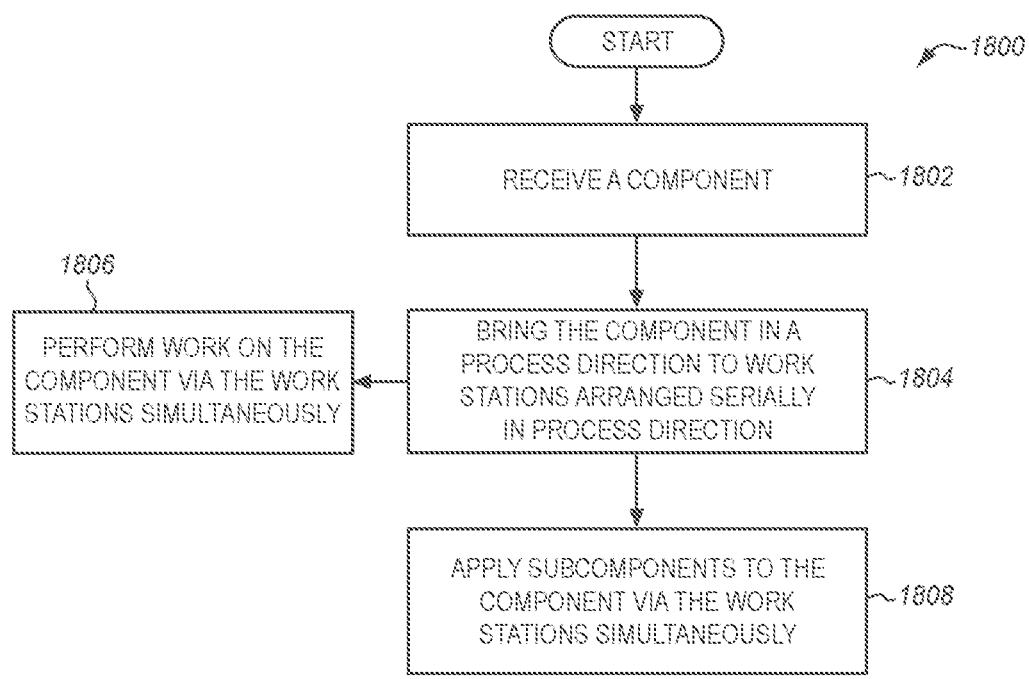
FIG. 17 is a flowchart illustrating a further method of takt time assembly in an illustrative embodiment.

FIG. 17 is a flowchart illustrating a further method 1800 for fabricating an airframe of an aircraft 10 at a desired takt time in an illustrative embodiment.

Method 1800 includes receiving 1802 a component 170, such as a half barrel section 117, 127, a portion of a crown module 364, or a floor grid 365, a frame 146, a window surround 145, a door surround 145-1, floor beams intercostals, or some other component represented as component 170. Method 1800 continues by bringing 1804 the component 170 (FIG. 3) in a process direction 199 to work stations 152 (FIG. 3) (including any tools, tooling and equipment there disposed) arranged serially in the process direction 199. In one embodiment, bringing 1804 the component 170 comprises advancing by a micropulse 129-3 the component 170 by less than its length. In a further embodiment, bringing 1804 the component 170 comprises advancing the component 170 along a track 112, 122. In some illustrative examples, the component is a section. Method 1800 includes performing 1806 work on the component 170 via the stations 152 simultaneously. Method 1800 includes performing 1806 work on the component 170 via the work stations 152 at the same time. The work may comprise any of the various tasks described above. For example, in one embodiment, performing 1806 the work comprises removing material from the component 170, such as a bearing edge of half barrel section 117, 127. The work stations 152 may perform additive manufacturing by adding material or subtractive manufacturing by removing material from the component 170 or a subcomponent 162, etc. Alternatively, processing proceeds to the applying 1808 of subcomponents 162 to the component 170 via the work stations 152 simultaneously.

In a further embodiment, the method further comprises establishing a takt time for the component 170, and determining a number of work stations 152 to arrange serially in the process direction 199 for the component 170 based on a work rate of each station, a size of the component 170 being worked upon, and the takt time within each work station 152. In a still further embodiment, the method comprises selecting a number of work stations 152 to perform the same task upon the component 170 based upon the takt time. For example, if two work stations 152 are incapable of installing a needed number of stow bins for a crown module 364 within the takt time, a third work station 152 will be added. A similar process is used for other components 170, many types of which are described and/or otherwise referenced herein.

Referring more particularly to the drawings, embodiments of the disclosure may be described in the context of aircraft manufacturing and service in method 1900 as shown in FIG. 18 and an aircraft 1902 as shown in FIG. 19. During pre-production, method 1900 may include specification and design 1904 of the aircraft 1902 and material procurement 1906. During production, component and subassembly manufacturing 1908 and system integration 1910 of the aircraft 1902 takes place. Thereafter, the aircraft 1902 may go through certification and delivery 1912 in order to be placed in service 1914. While in service by a customer, the aircraft 1902 is scheduled for routine work in maintenance and service 1916 (which may also include modification, reconfiguration, refurbishment, and so on). Apparatus and methods embodied herein may be employed during any one or more suitable stages of the production and service described in method 1900 (e.g., specification and design 1904, material procurement 1906, component and subassembly manufacturing 1908, system integration 1910, certification and delivery 1912, service 1914, maintenance and service 1916) and/or any suitable component of aircraft 1902 (e.g., airframe 1918, systems 1920, interior 1922, propulsion system 1924, electrical system 1926, hydraulic system 1928, environmental system 1930).

Each of the processes of method 1900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 1902 produced by method 1900 may include an airframe 1918 with a plurality of systems 1920 and an interior 1922. Examples of systems 1920 include one or more of a propulsion system 1924, an electrical system 1926, a hydraulic system 1928, and an environmental system 1930. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1900. For example, components or subassemblies corresponding to component and subassembly manufacturing 1908 may be fabricated or manufactured in a manner similar to components or subassemblies produced while the aircraft 1902 is in service. Also, one or more apparatus embodiments, method embodiments, or a combination thereof may be utilized during the subassembly manufacturing 1908 and system integration 1910, for example, by substantially expediting assembly of or reducing the cost of an aircraft 1902. Similarly, one or more of apparatus embodiments, method embodiments, or a combination thereof may be utilized while the aircraft 1902 is in service, for example and without limitation during the maintenance and service 1916. Thus, the invention may be used in any stages discussed herein, or any combination thereof, such as specification and design 1904, material procurement 1906, component and subassembly manufacturing 1908, system integration 1910, certification and delivery 1912, service 1914, maintenance and service 1916 and/or any suitable component of aircraft 1902 (e.g., airframe 1918, systems 1920, interior 1922, propulsion system 1924, electrical system 1926, hydraulic system 1928, and/or environmental system 1930).

In one embodiment, a part comprises a portion of airframe 1918, and is manufactured during component and subassembly manufacturing 1908. The part may then be assembled into an aircraft in system integration 1910, and then be utilized in service 1914 until wear renders the part unusable. Then, in maintenance and service 1916, the part may be discarded and replaced with a newly manufactured part. Inventive components and methods may be utilized throughout component and subassembly manufacturing 1908 in order to manufacture new parts.

Further, the disclosure comprises examples according to the following clauses:

Clause 1. A method for aircraft assembly, the method comprising: receiving a half barrel section 117, 127 of fuselage 12 in an assembly line 110, 120 having a plurality of serially arranged work stations 114, 124; advancing the half barrel section 117, 127 in a process direction 199 through the assembly line 110, 120 such that the half barrel section 117, 127 extends across at least a portion of the work stations 114, 124; and performing work on the half barrel section 117, 127 with the portion of the work stations 114, 124 simultaneously.

Clause 2. The method of clause 1 wherein advancing the half barrel section 117, 127 comprises pulsing 123 the half barrel section 117, 127 through the assembly line 110, 120.

Clause 3. The method of clause 2 wherein the portion of work stations 114, 124 perform work on the half barrel section 117, 127 during a pause between the pulses 123.

Clause 4. The method of clause 1 wherein advancing the half barrel section 117, 127 comprises micropulsing 129 the half barrel section 117, 127 through a purview 114-1, 124-1 of at least one of the work stations 114, 124.

Clause 5. The method of clause 4 wherein the portion of work stations 114, 124 perform work on the half barrel section 117, 127 during a pause between the micropulses 129.

Clause 6. The method of clause 1 wherein advancing the half barrel section 117, 127 comprises continuously moving the half barrel section 117, 127 through the assembly line 110, 120.

Clause 7. The method of clause 1 wherein advancing the half barrel section 117, 127 comprises pulsing 123 the half barrel section 117, 127 through the assembly line 110, 120 according to a common takt time, wherein the common takt time is based on a number of desired half barrel sections 117, 127 per month.

Clause 8. The method of clause 1 further comprising indexing the half barrel section 117, 127 to at least one of the serially arranged work stations 114, 124 during a pause between pulses 123.

Clause 9. The method of clause 1 further comprising: delivering components to one of the work stations 114, 124 as the half barrel section 117, 127 pulses 123 to or micropulses 129 through the work station 114, 124; and joining the components 170 to the half barrel section 117, 127 at the work station 114, 124.

Clause 10. The method of clause 9 wherein delivering components 170 is performed in an order of usage by the work station 114, 124.

Clause 11. The method of clause 9 wherein joining the components 170 comprises joining the components 170 to the half barrel section 117, 127 during a pause between pulses 123.

Clause 12. The method of clause 1 wherein advancing the half barrel section 117, 127 comprises moving the half barrel section 117, 127 through the multiple work stations 114, 124, the work stations 114, 124 being separated from each other by a distance less than a length of the half barrel section 117, 127.

Clause 13. The method of clause 1 wherein advancing the half barrel section 117, 127 comprises micro pulsing 129 the half barrel section 117, 127 through the multiple work stations 114, 124, a length of the micropulse 129 being equal to a multiple of a frame pitch 147 for the half barrel section 117, 127, the work stations 114, 124 separated by the frame pitch 147 for the half barrel section 117, 127.

Clause 14. The method of clause 1 wherein performing work on the half barrel section 117, 127 comprises operating the plurality of the work stations 114, 124 independently of each other.

Clause 15. The method of clause 1 wherein performing work on the half barrel section 117, 127 comprises operating a portion of the plurality of the work stations 114, 124 to remove material from the half barrel section 117, 127.

Clause 16. The method of clause 15 wherein operating a portion of the plurality of the work stations 114, 124 comprises at least one of removing and trimming door manufacturing excess, removing and trimming window manufacturing excess, and trimming a manufacturing excess from a bearing edge of the half barrel section 117, 127.

Clause 17. The method of clause 1 wherein performing work on the half barrel section 117, 127 comprises operating a portion of the plurality of the work stations 114, 124 to add components 170 to the half barrel section 117, 127.

Clause 18. The method of clause 15 wherein operating a portion of the plurality of the work stations 114, 124 comprises installing frames 146, installing window surrounds 145, installing door surrounds 145-1, and installing sealant.

Clause 19. The method of clause 1 wherein performing work on the half barrel section 117, 127 comprises operating a portion of the plurality of the work stations 114, 124 to non-destructively inspect the half barrel section 117, 127, non-destructively inspect a trimmed edge of the half barrel section 117, 127, and cleaning a portion of the half barrel section 117, 127.

Clause 20. A portion of an aircraft 10 assembled according to the method of clause 1.

Clause 21. A system 100 for processing half barrel sections 117, 127 of a fuselage, the system comprising: a plurality of serially arranged work stations 114, 124, the work stations 114, 124 separated by a distance less than a length of the half barrel sections 117, 127; and a track 112, 122, the track 112, 122 configured to receive the half barrel sections 117, 127 and advance the half barrel sections 117, 127 in a process direction 199 through the plurality of work stations 114, 124, such that at least two of the work stations 114, 124 are enabled to perform work on a half barrel section 117, 127 at the same time.

Clause 22. The system 100 of clause 21 wherein the track 112, 122 is configured to pulse 123 the half barrel sections 117, 127 through the plurality of work stations 114, 124.

Clause 23. The system 100 of clause 22 wherein the work stations 114, 124 are operated to perform work on the half barrel sections 117, 127 during a pause between the pulses 123.

Clause 24. The system 100 of clause 21 wherein the track 112, 122 is configured to micropulse 129 the half barrel sections 117, 127 through a purview 114-1, 124-1 of at least one of the work stations 114, 124.

Clause 25. The system 100 of clause 24 wherein the work stations 114, 124 are operated to perform work on the half barrel sections 117, 127 during a pause between the micropulses 129.

Clause 26. The system 100 of clause 21 wherein the track 112, 122 is configured to continuously move the half barrel sections 117, 127 through the plurality of work stations 114, 124.

Clause 27. The system 100 of clause 21 wherein the distance between the work stations 114, 124 is equal to a frame pitch 147 associated with the half barrel sections 117, 127.

Clause 28. The system 100 of clause 21 wherein the track 112, 122 is configured to pulse 123 the half barrel sections 117, 127 through the plurality of work stations 114, 124 according to a common takt time, wherein the common takt time is based on a number of desired half barrel sections 117, 127 per month.

Clause 29. The system 100 of clause 21 wherein at least one of the work stations 114, 124 comprises an indexing component 115, 125, the indexing component 115, 125 configured to operate in association with an indexing feature 133 on the half barrel section 117, 127 and the track 112, 122 to position the half barrel section 117, 127 within the work station 114, 124.

Clause 30. The system 100 of clause 21 wherein the plurality of work stations 114, 124 are separately configured to perform work from the group consisting of frame 146 installation, window surround 145 installation, window excess trimming, door surround 145-1 installation, door excess trimming, trimming of a bearing edge of the half barrel section 117, 127, cleaning, sealing, Non-Destructive Inspection (NDI) of the half barrel section 117, 127, and Non-Destructive Inspection (NDI) of a trimmed edge.

Clause 31. Fabricating a portion of an aircraft 10 using the system 100 of clause 43.

Clause 32. A method for assembling a fuselage 12, the method comprising: advancing a uniform cross-section upper half barrel section 126 and a corresponding, inverted uniform cross-section lower half barrel section 128 of fuselage 12 in a process direction 199 along a first assembly line 120 at a first takt time; advancing a non-uniform cross-section upper half barrel section 116 and a corresponding, inverted non-uniform cross-section lower half barrel section 118 of fuselage 12 in a process direction 199 along a second assembly line 110 at a second takt time; rotating the two lower half barrel sections 118, 128 to a keel down orientation 563-1; attaching the upper half barrel sections 116, 126 to the corresponding lower half barrel sections 118, 128 to form two full barrel sections 44, one full barrel section 44 having a uniform cross-section and one full barrel section 44 having a non-uniform cross-section; and attaching the two full barrel sections 44 together to form a portion of fuselage 12.

Clause 33. The method of clause 32 further comprising: periodically pulsing, at the takt time, the uniform cross-section upper half barrel section 126 and the corresponding, inverted uniform cross-section lower half barrel section 128 in the process direction 199 through a plurality of work stations 124 of the assembly line 120, simultaneously, the same distance; and performing work on the uniform cross-section half barrel sections 126, 128 at multiple of the work stations 124 during pauses in between pulses 123.

Clause 34. The method of clause 32 further comprising: periodically pulsing, at the second takt time, the non-uniform cross-section upper half barrel section 116 and the corresponding, inverted non-uniform cross-section lower half barrel section 118 in the process direction 199 through a plurality of work stations 114 of the second assembly line 110, simultaneously, the same distance; performing work on the non-uniform cross-section half barrel sections 116, 118 at multiple of the work stations 114 during pauses in between pulses 123.

Clause 35. The method of clause 32 further comprising: moving the uniform cross-section lower half barrel section 128 from the assembly line 120 to an assembly stage 331; installing a floor grid 365 into the uniform cross-section lower half barrel section 128; and after rotating the uniform cross-section lower half barrel section 128 to a keel down orientation 563-1, moving the uniform cross-section lower half barrel section 128 to a join station 194.

Clause 36. The method of clause 32 further comprising: moving the uniform cross-section upper half barrel section 126 from the assembly line 120 to an assembly stage 321; installing a crown module 364 into the uniform cross-section upper half barrel section 126; and moving the uniform cross-section upper half barrel section 126 to a join station 194.

Clause 37. The method of clause 32 wherein rotating the two lower half barrel sections 118, 128 comprises: locating each lower half barrel section 118, 128 in a corresponding inversion station 560, the inversion station 560 being between an assembly stage 330, 331 and a join station 184, 194.

Clause 38. The method according to clause 32 wherein attaching the upper half barrel section 116, 126 to the corresponding lower half barrel section 118, 128 comprises installing a splice plate 920 between the upper half barrel section 116, 126 and the corresponding lower half barrel section 118, 128.

Clause 39. The method according to clause 38 wherein installing a splice plate 920 comprises: attaching the splice plate 920 to one of the upper half barrel sections 116, 126 and lower half barrel sections 118, 128; aligning the upper half barrel section 116, 126 with the corresponding lower half barrel section 118, 128; and attaching the splice plate 920 to the other of the upper half barrel section 116, 126 and lower half barrel section 118, 128.

Clause 40. The method of clause 39 wherein aligning the upper half barrel section 116, 126 with the lower half barrel section 118, 128 further comprises bringing a lower boundary 902 of the upper half barrel section 116, 126 into contact with the upper boundary 904 of a lower half barrel section 118, 128.

Clause 41. A portion of an aircraft 10 assembled according to the method of clause 32.

Clause 42. A system for assembling a portion of a fuselage 12, the system comprising: a first plurality of assembly stages 320, 321 for placing crown modules 364 into uniform and non-uniform cross-section upper half barrel sections 116, 126; a second plurality of assembly stages 330, 331 for placing floor grids 365 into inverted, uniform and non-uniform cross-section lower half barrel sections 118, 128; a first join station 184 for attaching non-uniform cross-section upper half barrel sections 116 and non-uniform cross-section lower half barrel sections 118 to form non-uniform cross-section full barrel sections 44; and a second join station 194 for attaching uniform cross-section upper half barrel sections 126 and uniform cross-section lower half barrel sections 128 to form uniform cross-section full barrel sections 44.

Clause 43. A system according to clause 42 further comprising: a first inversion station 560 for inverting a non-uniform cross-section lower half barrel section 118 from a keel up orientation 563-3 to a keel down orientation 563-1; and a second inversion station 560 for inverting a uniform cross-section lower half barrel section 128 from a keel up orientation 563-3 to a keel down orientation 563-1.

Clause 44. A system according to clause 43 further comprising at least one work cell 188, 198 for joining full barrel sections 44 together.

Clause 45. A system according to clause 42 wherein the first plurality of assembly stages 320, 321 each comprise at least one feeder line 366 operable to provide one of completed crown modules 364 and crown module components to the respective assembly stage 320, 321.

Clause 46. A system according to clause 42 wherein the second plurality of assembly stages 330, 331 each comprise at least one feeder line 366 operable to provide one of completed floor grids 365 and floor grid components to the respective assembly stage 330, 331.

Clause 47. A system according to clause 42 wherein the first plurality of assembly stages 320, 321 each comprise at least one feeder line 380, 382 operable to provide one of fasteners and sealant to the respective assembly stage 320, 321.

Clause 48. A system according to clause 42 wherein the second plurality of assembly stages 330, 331 each comprise at least one feeder line 380, 382 operable to provide one of fasteners and sealant to the respective assembly stage 330, 331.

Clause 49. A system according to clause 42 further comprising at least one track 186, 196 for moving full barrel sections 44 to a work cell 188, 198 for joining full barrel sections 44 together.

Clause 50. A system according to clause 42 wherein: at least one of the assembly stages 320, 330 and the first join station 184 are operable to attach a splice plate 920 to one or both of the non-uniform cross-section upper half barrel 116 section and the non-uniform cross-section lower half barrel section 118; and at least one of the assembly stages 321, 331 and the second join station 194 are operable to attach a splice plate 920 to one or both of the uniform cross-section upper half barrel section 126 and the uniform cross-section lower half barrel section 128.

Clause 51. A system according to clause 50 further comprising at least one work cell 188 for joining full barrel sections 44 together, the at least one work cell 188 operable to: align the non-uniform cross-section upper half barrel section 116 with the non-uniform cross-section lower half barrel section 118 by bringing a lower boundary 902 of the non-uniform cross-section upper half barrel section 116 into contact with the upper boundary 904 of a non-uniform cross-section lower half barrel section 118; and attach the splice plate 920 to one or both of the non-uniform cross-section upper half barrel section 116 and the non-uniform cross-section lower half barrel section 118.

Clause 52. A system according to clause 50 further comprising at least one work cell 198 for joining full barrel sections 44 together, the at least one work cell 198 operable to: align the uniform cross-section upper half barrel section 126 with the uniform cross-section lower half barrel section 128 by bringing a lower boundary 902 of the uniform cross-section upper half barrel section 126 into contact with the upper boundary 904 of a uniform cross-section lower half barrel section 128; and attach the splice plate 920 to one or both of the uniform cross-section upper half barrel section 126 and the uniform cross-section lower half barrel section 128.

Clause 53. Fabricating a portion of an aircraft 10 using the system of clause 42.

Clause 54. A method for aircraft assembly, the method comprising: moving a half barrel section 117, 127 of fuselage 12 along an assembly line 150 having a plurality of serially arranged work stations 152, each particular work station 152 including one or more of workers, tools, and equipment that are utilized in an assigned assembly task for the half barrel section 117, 127 for each particular work station 152; and performing the assembly task for the half barrel section 117, 127 for each particular work station 152.

Clause 55. A method according to clause 54 wherein moving the half barrel section 117, 127 comprises advancing the half barrel section 117, 127 in a process direction 199 through the assembly line 150 such that the half barrel section 117, 127 extends across at least a portion of the work stations 152.

Clause 56. A method according to clause 55 wherein advancing the half barrel section 117, 127 in a process direction 199 through the assembly line 150 comprises at least one of: pulsing the half barrel section 117, 127 by less than its length through the plurality of serially arranged work stations 152; micropulsing 129 the half barrel section 117, 127 through a purview associated with one of the plurality of serially arranged work stations 152; and continuously moving the half barrel section 117, 127 through the plurality of serially arranged work stations 152.

Clause 57. A method according to clause 56 wherein performing the assembly task comprises performing work on the half barrel section 117, 127 during a pause between the pulsing and the micropulsing 129.

Clause 58. A method according to clause 55 wherein performing the assembly task comprises simultaneously applying subcomponents 162 to the half barrel section 117, 127 with at least one of the serially arranged work stations 152 and removing manufacturing excess from the half barrel section 117, 127 with at least one other of the serially arranged work stations 152.

Clause 59. A method according to clause 54 further comprising: establishing a takt time for the half barrel section 117, 127 of fuselage 12; and determining a number of serially arranged work stations 152 needed to perform the assembly task at the takt time based on: a work rate of each work station 152, a size of the half barrel section 117, 127, and the takt time.

Clause 60. A method according to clause 54 further comprising using a feeder line 160 to supply subcomponents 162 to a work station 152.

Clause 61. A method according to clause 54 further comprising carrying inspection data 167-1 from an exit line 169 associated with one of the work stations 152.

Clause 62. A method according to clause 54 further comprising carrying material 167-2 removed from the half barrel section 117, 127 away from the work station 152 using an exit line 169 associated with the work station 152.

Clause 63. A portion of an aircraft 10 assembled according to the method of clause 54.

Clause 64. A system 150, comprising: a plurality of work stations 152 arranged serially in a process direction 199; and a track 154 that brings half barrel sections 117, 127 of fuselage 12 in a process direction 199 to one or more of workers, tools and equipment disposed at individual ones of the work stations 152, allowing work to be performed on the half barrel sections 117, 127 simultaneously by a plurality of the work stations 152.

Clause 65. A system 150 according to clause 64 wherein the track 154 is operable to move the half barrel sections 117, 127 in a process direction 199 through the work stations 152 such that the half barrel section 117, 127 extends across at least a portion of the work stations 152.

Clause 66. A system 150 according to clause 65 wherein the track 154 is operable to: pulse 123 the half barrel section 117, 127 by less than its length through the plurality of serially arranged work stations 152; micropulse 129 the half barrel section 117, 127 through a purview associated with one of the plurality of serially arranged work stations 152; and continuously move the half barrel section 117, 127 through the plurality of serially arranged work stations 152.

Clause 67. A system 150 according to clause 64 wherein the work stations 152 are arranged at a work density based on a takt time for the half barrel section 117, 127.

Clause 68. A system 150 according to clause 64 further comprising: at least one exit line 169 associated with one of the work stations 152 for removing material 167-2 from the work station 152.

Clause 69. A system 150 according to clause 64 further comprising at least one feeder line 160 associated with one of the work stations 152 for supplying one or more of materials and subcomponents 162 to the work station 152.

Clause 70. A system 150 according to clause 69 wherein the at least one feeder line 160 is configured to supply one or more of materials and subcomponents 162 to the work station 152 based on a takt time for the half barrel section 117, 127.

Clause 71. A system 150 according to clause 64 wherein two of the plurality of work stations 152 are configured such that a gap 121 separates a first half barrel section 117, 127 and a second half barrel section 117, 127 on the track 154, the gap 121 configured to allow ingress and egress of one or more of workers and tools to and from the system 150.

Clause 72. Fabricating a portion of an aircraft 10 using the system 150 of clause 64.

Clause 73. A method for assembling an aircraft 10, the method comprising: advancing an inverted lower half barrel section 118, 128 of fuselage 12 in a process direction 199 through an assembly line 110, 120 of work stations 114, 124; advancing an upper half barrel section 116, 126 of fuselage 12 in the process direction 199 through the assembly line 110, 120, behind and simultaneously with the inverted lower half barrel section 118, 128 such that the inverted lower half barrel section 118, 128 and the upper half barrel section 116, 126 advance in series; performing work on the inverted lower half barrel section 118, 128 and the upper half barrel section 116, 126 as they advance through the assembly line 110, 120; removing the inverted lower half barrel section 118, 128 from the assembly line 110, 120; removing the upper half barrel section 116, 126 from the assembly line 110, 120 while the inverted lower half barrel section 118, 128 is being rotated to a keel down orientation 563-1; and attaching the upper half barrel section 116, 126 to the lower half barrel section 118, 128.

Clause 74. The method of clause 73 further comprising installing a floor grid 365 into the inverted lower half barrel section 118, 128, after the inverted lower half barrel section 118, 128 has been removed from the assembly line 110, 120 and while the upper half barrel section 116, 126 continues through the assembly line 110, 120.

Clause 75. The method of clause 73 wherein advancing an upper half barrel section 116, 126 comprises maintaining a spacing between the upper half barrel section 116, 126 and the inverted lower half barrel section 118, 128 that is less than a length of the inverted lower half barrel section 118, 128.

Clause 76. The method of clause 73 wherein advancing an upper half barrel section 116, 126 comprises maintaining a spacing between the upper half barrel section 116, 126 and the inverted lower half barrel section 118, 128 that is greater than or equal to a distance between work stations 114, 124 of the assembly line 110, 120.

Clause 77. The method of clause 73 wherein advancing an inverted lower half barrel section 118, 128 and advancing an upper half barrel section 116, 126 comprises continuously moving the lower half barrel section 118, 128 and the upper half barrel section 116, 126 in the process direction 199 through the assembly line 110, 120 while work is being performed on the lower half barrel section 118, 128 and the upper half barrel section 116, 126.

Clause 78. The method of clause 73 wherein advancing an upper half barrel section 116, 126 comprises maintaining a spacing between work stations 114, 124 that perform work on the assembly line 110, 120 that is between a frame pitch 147 of the fuselage 12 and a length of a half barrel section 44.

Clause 79. The method of clause 73 wherein a gap 131 between the upper half barrel section 116, 126 and the inverted lower half barrel section 118, 128 within the assembly line 110, 120 is larger than a spacing between work stations 114, 124 within the assembly line 110, 120, thereby enabling a work station 114, 124 to be idle when disposed between adjacent lower half barrel sections 118, 128 and corresponding upper half barrel sections 116, 126 during fabrication.

Clause 80. The method of clause 73 wherein removing the upper half barrel section 116, 126 from the assembly line 110, 120 while the inverted lower half barrel section 118, 128 is being rotated to a keel down orientation 563-1 comprises: installing a floor grid 365 into the inverted lower half barrel section 118, 128 while the upper half barrel section continues to progress along the assembly line 110, 120; and installing a crown module 364 into the upper half barrel section 116, 126 after removal from the assembly line 110, 120 and while the inverted lower half barrel section 118, 128 is being rotated to a keel down orientation 563-1.

Clause 81. A portion of an aircraft 10 assembled according to the method of clause 73.

Clause 82. A system 100 for assembling an airframe of an aircraft 10, the system 100 comprising: an assembly line 110, 120 that advances, in order, an inverted lower half barrel section 118, 128 of fuselage 12 and an upper half barrel section 116, 126 of fuselage 12 in a process direction 199, the assembly line including a plurality of work stations 114, 124 arranged in the process direction 199 which perform work on the inverted lower half barrel section 118, 128 and the upper half barrel section 116, 126; an inversion station 560 operable to rotate the lower half barrel section 118, 128 from a keel up orientation 563-3 to a keel down orientation 563-1; and a join station 184, 194 attaches the lower half barrel section 118, 128 to the upper half barrel section 116, 126.

Clause 83. A system 100 according to clause 82 wherein work on the lower half barrel section 118, 128 in the inversion station 560 has a takt time such that the upper half barrel section 116, 126 and the lower half barrels section 118, 128 synchronously arrive at the join station 184, 194.

Clause 84. A system 100 according to clause 82 further comprising a floor grid assembly stage 330, 331 that receives the inverted lower half barrel section 118, 128 from the assembly line 110, 120 and installs a floor grid 365 into the inverted lower half barrel section 118, 128.

Clause 85. A system 100 according to clause 82 further comprising a crown module assembly stage 320, 321 that receives the upper half barrel section 116, 126 from the assembly line 110, 120 and installs a crown module 364 into the upper half barrel section 116, 126.

Clause 86. A system 100 according to clause 82 wherein the work stations 114, 124 perform work selected from the group consisting of: installing window surrounds 145, installing door surrounds 145-1, trimming manufacturing excess, installing frames 146, cutting out windows, and cutting out doors.

Clause 87. The system 100 of clause 82 wherein the assembly line 110, 120 comprises a track 112, 122 that periodically pulses 123 the inverted lower half barrel section 118, 128 and the upper half barrel section 116, 126 in the process direction 199 such that the work stations 114, 124 perform work on the inverted lower half barrel section 118, 128 and the upper half barrel section 116, 126 during pauses between pulses 123.

Clause 88. The system 100 of clause 82 wherein the assembly line 110, 120 comprises a track 112, 122 that continuously moves the inverted lower half barrel section 118, 128 and the upper half barrel section 116, 126 in the process direction 199 such that the work stations 114, 124 perform work on the inverted lower half barrel section 118, 128 and the upper half barrel section 116, 126 during the continuously moving.

Clause 89. Fabricating a portion of an aircraft using the system of clause 82.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for aircraft assembly, the method comprising:
receiving a uniform cross-section upper half barrel section of fuselage and a corresponding, inverted uniform cross-section lower half barrel section of fuselage in a first assembly line having a first plurality of serially arranged work stations;
receiving a non-uniform cross-section upper half barrel section of fuselage and a corresponding, inverted non-uniform cross-section lower half barrel section of fuselage in a second assembly line having a second plurality of serially arranged work stations;
advancing the uniform cross-section upper half barrel section and the uniform cross-section lower half barrel section of fuselage in a process direction through the first assembly line at a first takt time such that each of the uniform cross-section upper half barrel section of fuselage and the uniform cross-section lower half barrel section of fuselage extends across at least two of the work stations of the first plurality of serially arranged work stations;
advancing the non-uniform cross-section upper half barrel section and the non-uniform cross-section lower half barrel section of fuselage in the process direction through the second assembly line at a second takt time;
performing work on the uniform cross-section upper half barrel section with the at least two the work stations of the first plurality of serially arranged work stations simultaneously;
rotating the uniform cross-section lower half barrel section and the non-uniform cross-section lower half barrel section to a keel down orientation;
attaching the upper half barrel sections to the corresponding lower half barrel sections to form two full barrel sections, one full barrel section having a uniform cross-section and one full barrel section having a non-uniform cross-section; and
attaching the two full barrel sections together to form a portion of fuselage.

2. The method of claim 1 further comprising:
periodically pulsing, at the first takt time, the uniform cross-section upper half barrel section and the corresponding, inverted uniform cross-section lower half barrel section in the process direction through the first plurality of serially arranged work stations of the first assembly line, simultaneously, the same distance; and
performing work on the uniform cross-section upper half barrel section and uniform cross-section lower half barrel section at multiple of the work stations during pauses in between pulses.

3. The method of claim 1 further comprising:
periodically pulsing, at the second takt time, the non-uniform cross-section upper half barrel section and the corresponding, inverted non-uniform cross-section lower half barrel section in the process direction through the second plurality of work stations of the second assembly line, simultaneously, the same distance; and
performing work on the non-uniform cross-section upper half barrel section and the non-uniform cross-section lower half barrel section at multiple of the work stations during pauses in between pulses.

4. The method of claim 1 further comprising:
moving the uniform cross-section lower half barrel section from the first assembly line to an assembly stage;
installing a floor grid into the uniform cross-section lower half barrel section; and
after rotating the uniform cross-section lower half barrel section to a keel down orientation, moving the uniform cross-section lower half barrel section to a join station.

5. The method of claim 1 further comprising:
moving the uniform cross-section upper half barrel section from the first assembly line to an assembly stage;

installing a crown module into the uniform cross-section upper half barrel section; and moving the uniform cross-section upper half barrel section to a join station.

6. The method of claim 1 wherein rotating the uniform cross-section lower half barrel section and the non-uniform cross-section lower half barrel section comprises:

locating each lower half barrel section in a corresponding inversion station, each inversion station being between an assembly stage and a join station.

7. The method of claim 1 wherein attaching the upper half barrel sections to the corresponding lower half barrel sections comprises installing a splice plate between the upper half barrel sections and the corresponding lower half barrel sections.

8. The method of claim 7 wherein installing a splice plate comprises:

attaching splice plates to the upper half barrel sections or the lower half barrel sections;

aligning the upper half barrel sections with the corresponding lower half barrel sections; and attaching the splice plates to the other of the upper half barrel sections or the lower half barrel sections.

9. The method of claim 8 wherein aligning the upper half barrel sections with the lower half barrel sections further comprises bringing lower boundaries of the upper half barrel sections into contact with upper boundaries of the lower half barrel sections.

10. A method for assembling a fuselage, the method comprising:

advancing a uniform cross-section upper half barrel section of fuselage and a corresponding, inverted uniform cross-section lower half barrel section of fuselage in a process direction along a first assembly line at a first takt time;

advancing a non-uniform cross-section upper half barrel section of fuselage and a corresponding, inverted non-uniform cross-section lower half barrel section of fuselage in the process direction along a second assembly line at a second takt time;

rotating the uniform cross-section lower half barrel section and the non-uniform cross-section lower half barrel section to a keel down orientation;

attaching the upper half barrel sections to the corresponding lower half barrel sections to form two full barrel sections, one full barrel section having a uniform cross-section and one full barrel section having a non-uniform cross-section; and attaching the two full barrel sections together to form a portion of fuselage.

11. The method of claim 10 further comprising:

periodically pulsing, at the first takt time, the uniform cross-section upper half barrel section and the corresponding, inverted uniform cross-section lower half barrel section in the process direction through a plurality of work stations of the first assembly line, simultaneously, the same distance; and performing work on the uniform cross-section upper half barrel section and uniform cross-section lower half barrel section at multiple of the work stations during pauses in between pulses.

12. The method of claim 10 further comprising:

periodically pulsing, at the second takt time, the non-uniform cross-section upper half barrel section and the corresponding, inverted non-uniform cross-section lower half barrel section in the process direction through a plurality of work stations of the second assembly line, simultaneously, the same distance; and performing work on the non-uniform cross-section half barrel sections at multiple of the work stations during pauses in between pulses.

13. The method of claim 10 further comprising:

moving the uniform cross-section lower half barrel section from the first assembly line to an assembly stage;

installing a floor grid into the uniform cross-section lower half barrel section; and after rotating the uniform cross-section lower half barrel section to a keel down orientation, moving the uniform cross-section lower half barrel section to a join station.

14. The method of claim 10 further comprising:

moving the uniform cross-section upper half barrel section from the first assembly line to an assembly stage;

installing a crown module into the uniform cross-section upper half barrel section; and moving the uniform cross-section upper half barrel section to a join station.

15. The method of claim 10 wherein rotating the uniform cross-section lower half barrel section and the non-uniform cross-section lower half barrel section comprises:

locating each lower half barrel section in a corresponding inversion station, each inversion station being between an assembly stage and a join station.

16. The method of claim 10 wherein attaching the upper half barrel sections to the corresponding lower half barrel sections comprises installing a splice plate between the upper half barrel sections and the corresponding lower half barrel sections.

17. The method of claim 16 wherein installing a splice plate comprises:

attaching splice plates to the upper half barrel sections or the lower half barrel sections;

aligning the upper half barrel sections with the corresponding lower half barrel sections; and attaching the splice plates to the other of the upper half barrel sections or the lower half barrel sections.

18. The method of claim 17 wherein aligning the upper half barrel sections with the lower half barrel sections further comprises bringing lower boundaries of the upper half barrel sections into contact with upper boundaries of the lower half barrel sections.

19. A method for assembling an aircraft, the method comprising:

advancing an inverted uniform cross-section lower half barrel section of fuselage in a process direction through a first assembly line of work stations;

advancing a uniform cross-section upper half barrel section of fuselage in the process direction through the first assembly line, behind and simultaneously with the inverted uniform cross-section lower half barrel section such that the inverted uniform cross-section lower half barrel section and the uniform cross-section upper half barrel section advance in series at a first takt time;

advancing an inverted non-uniform cross-section lower half barrel section of fuselage in the process direction through a second assembly line of work stations;

advancing a non-uniform cross-section upper half barrel section of fuselage in the process direction through the second assembly line, behind and simultaneously with the inverted non-uniform cross-section lower half barrel section such that the inverted non-uniform cross-section lower half barrel section and the non-uniform cross-section upper half barrel section advance in series at a second takt time;

performing work on the inverted uniform cross-section lower half barrel section and the uniform cross-section upper half barrel section as they advance through the first assembly line;

removing the inverted uniform cross-section lower half barrel section from the first assembly line;

rotating the uniform cross-section lower half barrel section and the non-uniform cross-section lower half barrel section to a keel down orientation;

removing the uniform cross-section upper half barrel section from the first assembly line while the inverted uniform cross-section lower half barrel section is being rotated to the keel down orientation;

attaching the upper half barrel sections to the corresponding lower half barrel sections to form two full barrel sections, one full barrel section having a uniform cross-section and one full barrel section having a non-uniform cross-section; and attaching the two full barrel sections together to form a portion of fuselage.

20. The method of claim 19 further comprising:

periodically pulsing, at the first takt time, the uniform cross-section upper half barrel section and a corresponding, inverted uniform cross-section lower half barrel section in the process direction through the first assembly line of work stations, simultaneously, the same distance; and performing work on the uniform cross-section upper half barrel section and uniform cross-section lower half barrel section at multiple of the work stations during pauses in between pulses.

21. The method of claim 19 further comprising:

periodically pulsing, at the second takt time, the non-uniform cross-section upper half barrel section and a corresponding, inverted non-uniform cross-section lower half barrel section in the process direction through the second assembly line of work stations, simultaneously, the same distance; and performing work on the non-uniform cross-section upper half barrel section and the non-uniform cross-section lower half barrel section at multiple of the work stations during pauses in between pulses.

22. The method of claim 19 further comprising:

moving the uniform cross-section lower half barrel section from the first assembly line to an assembly stage;

installing a floor grid into the uniform cross-section lower half barrel section; and after rotating the uniform cross-section lower half barrel section to a keel down orientation, moving the uniform cross-section lower half barrel section to a join station.

23. The method of claim 19 further comprising:

moving the uniform cross-section upper half barrel section from the first assembly line to an assembly stage;

installing a crown module into the uniform cross-section upper half barrel section; and moving the uniform cross-section upper half barrel section to a join station.

24. The method of claim 19 wherein rotating the uniform cross-section lower half barrel section and the non-uniform cross-section lower half barrel section comprises:

locating each lower half barrel section in a corresponding inversion station, each inversion station being between an assembly stage and a join station.

* * * * *